United States Patent [19]
Sample et al.

[11] 3,774,056
[45] Nov. 20, 1973

[54] DIGITAL ELECTRONIC CONTROL CIRCUIT FOR CYCLICALLY OPERABLE APPLIANCES AND THE LIKE

[75] Inventors: Steven B. Sample; Paul R. Scheuer; Stevan W. Speheger; Karmen D. Cox, all of Lafayette, Ind.

[73] Assignee: Design and Manufacturing Corporation, Connersville, Ind.

[22] Filed: Apr. 29, 1971

[21] Appl. No.: 138,625

[52] U.S. Cl............. 307/293, 134/57 D, 134/58 D, 259/1, 307/141, 307/220, 340/309.1, 340/309.4, 328/48, 328/49, 328/130
[51] Int. Cl. .......................................... H03k 17/26
[58] Field of Search............. 307/141, 141.4, 141.8, 307/220–226, 293; 328/129–131, 39, 41–49; 317/141, 142; 340/309.1, 309.4; 34/43, 44, 53; 134/57 D, 58 D; 259/1

[56] References Cited
UNITED STATES PATENTS

| | | | |
|---|---|---|---|
| 2,970,226 | 1/1961 | Skelton et al........................ | 307/293 |
| 3,383,525 | 5/1968 | Arksey............................. | 328/129 X |
| 3,378,703 | 4/1968 | Huxster et al. ..................... | 307/293 |
| 3,409,761 | 11/1968 | Becker.............................. | 328/46 X |
| 3,464,673 | 9/1969 | Cargo et al. ................... | 134/57 D X |
| 3,539,153 | 11/1970 | Wennerberg et al. ............ | 134/57 D |
| 3,548,203 | 12/1970 | Basse et al........................ | 328/48 X |
| 3,639,844 | 2/1972 | Karklys........................... | 307/293 X |
| 3,646,371 | 2/1972 | Flad................................... | 307/293 |
| 3,662,186 | 5/1972 | Karklys.............................. | 307/141 |

OTHER PUBLICATIONS

"A Digital IC Timer" by Steinbach in Electronics World dated May 1969, Pages 48–50.

*Primary Examiner*—Stanley D. Miller, Jr.
*Attorney*—Melville, Strasser, Foster & Hoffman

[57] ABSTRACT

An electronic digital control system for automatic appliances and the like of the type capable of carrying on one or more cycles, each cycle comprising a plurality of sequential operations, each operation in turn comprising a plurality of events in sequence performed by a number of on-off machine devices or functions. The control system comprises a control logic circuit which performs logical operations on inputs from a source of regularly spaced electrical pulses, sensors, and panel switches of the appliance; and generates outputs which, either directly or by means of interfacing devices, activate and deactivate the machine functions in a desired time sequence and/or in accordance with a desired control strategy based on criteria other than time, by controlling the power to the machine functions.

72 Claims, 26 Drawing Figures

INVENTOR/S
STEVEN B. SAMPLE
STEVAN W. SPEWEGER
PAUL R. SCHEUER
KARMEN D. COX

BY Melville, Strasser, Foster and Hoffman
ATTORNEYS

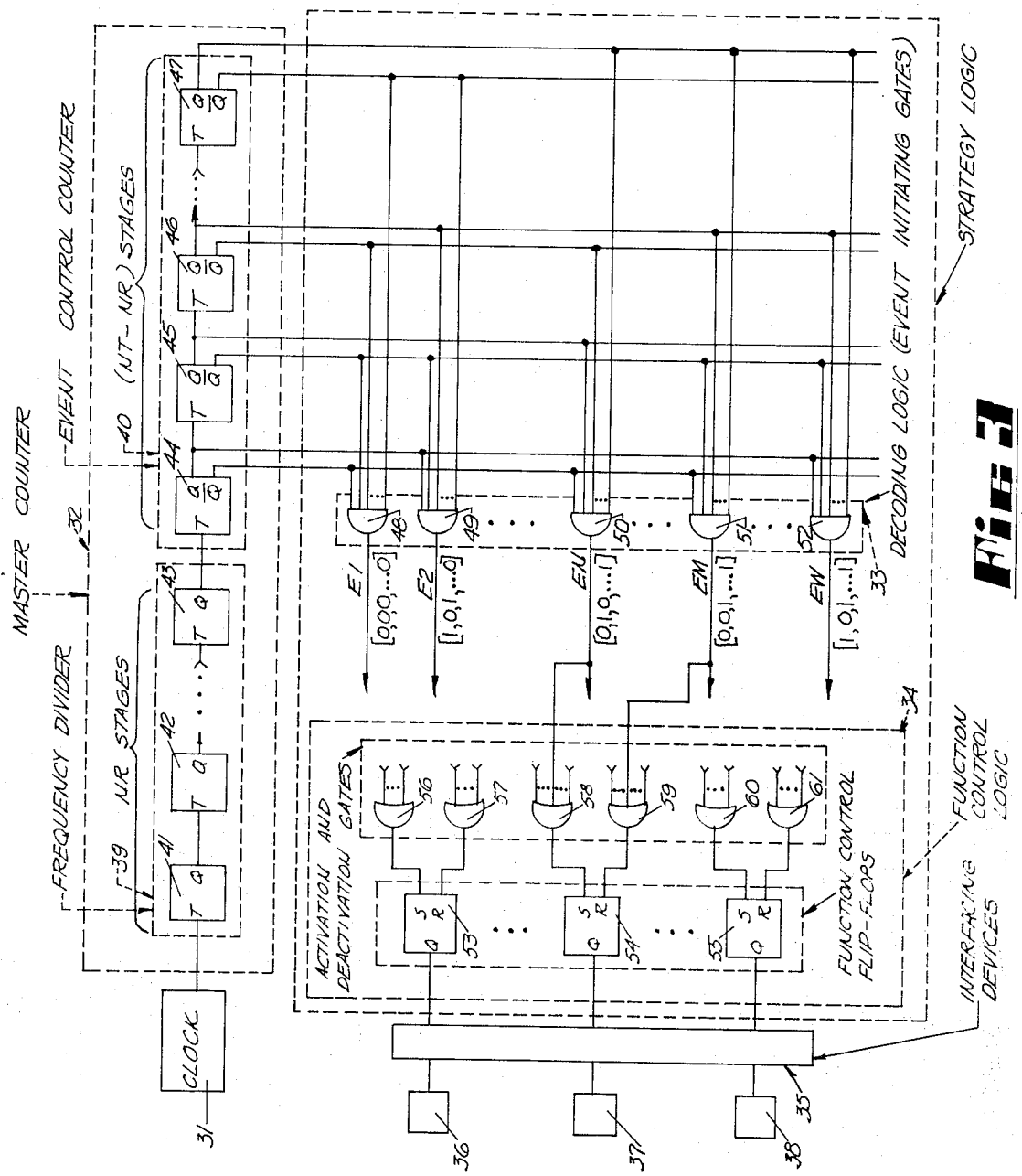

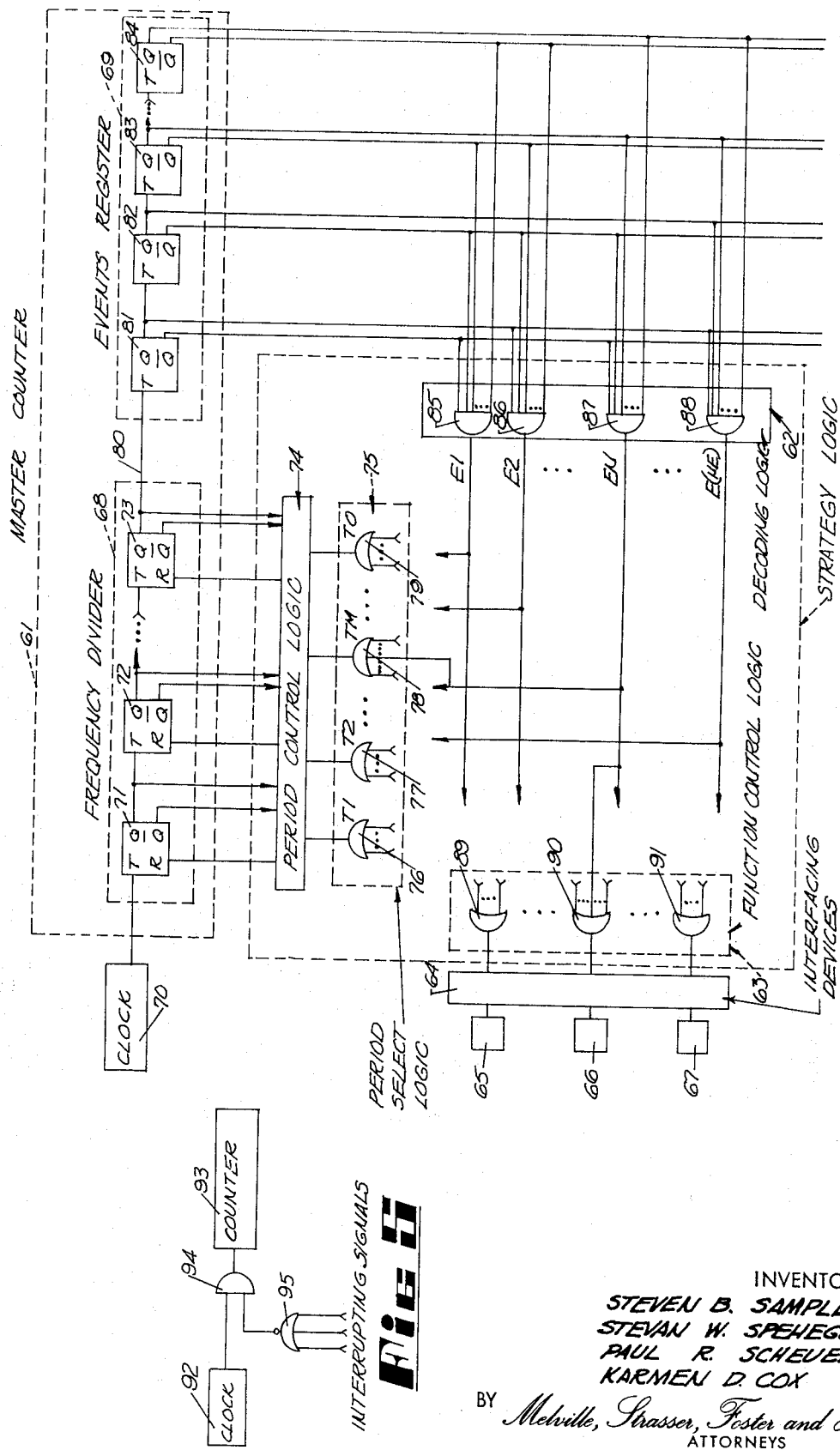

INVENTOR/S
STEVEN B. SAMPLE
STEVAN W. SPEHEGER
PAUL R. SCHEUER
KARMEN D. COX

BY *Melville, Strasser, Foster and Hoffman*
ATTORNEYS

DIGITAL ELECTRONIC CONTROL CIRCUIT FOR CYCLICALLY OPERABLE APPLIANCES AND THE LIKE

BACKGROUND OF THE INVENTION

1. Field of the Invention

The invention relates to an electronic digital control system and its appurtenances, and more particularly to such a control system for an appliance or the like of the type having a plurality of devices capable of performing a plurality of operations in one or more predetermined sequences.

2. Description of the Prior Art

For purposes of an exemplary showing, the control system of the present invention will be described as applied to a dishwashing machine. A dishwashing machine is typical of the general class of appliances or the like to which the control system of the present invention may be advantageously applied. It will be understood by one skilled in the art, upon reading this specification, that the control system of the present invention may be applied to any suitable appliance capable of performing a number of sequential operations, and its description with respect to a dishwashing machine is not intended to be limiting.

In present day dishwashing machines, the various operations are controlled or initiated by electrical means. A dishwashing machine generally comprises a vat having a front or top opening with a suitable closure means. There is ordinarily an electric motor which drives one or more pumps, and which often drives an impeller for showering the tableware in the vat with water. In many such machines a pump is employed of such character as to result in circulating the water when the motor is driven in one direction, and draining the vat when the motor is driven in the opposite direction. The dishwasher generally contains additional electrically operated elements, which may be varied as to number and kind, but which may include (without limitation) such elements as a heater, solenoid operated valves, a general illuminant, indicator means and solenoid operated means for injecting surface-active or other substances into the vat. The nature and function of these various means are well known in the art and do not constitute a limitation on the present invention. Thus, for convenience, these various elements will hereinafter be referred to as the "machine functions." It will be noted that the various machine functions are generally of the "on-off" type.

Automatic dishwashers are arranged to carry on a plurality of "operations," through the agency of the various machine functions, in sequence. The sequential series of operations is generally referred to as a "cycle." For example, a typical automatic dishwasher is arranged to carry on in sequence a cycle of operations which may be designated as first wash, first rinse, second rinse, second wash, third rinse, fourth rinse, and dry.

Each of the above listed operations will, in turn, comprise one or more "events." For example, the first rinse operation may be made up of the following exemplary events: pause, fill, spray, pause and drain. Therefore each cycle may be thought of as simply comprising a plurality of sequential events. The grouping of events into operations is strictly a matter of convenience.

The carrying on of this or some other cycle of operations has heretofore been controlled by a timer of which various varieties are known. In general, the timer comprises a motor. In some instances, the motor drives a device like a commutator which results in sequential, and in some instances simultaneous, opening and closing of electric switches. In other instances, the timer motor drives a rotating element providing a plurality of camming surfaces for operating electric switches. The switch operating devices of some timers are arranged to be driven at a constant speed during the operation of the dishwasher. In other instances, the switch operating mechanism is arranged to be advanced step-wise.

At times, the operator of the dishwashing machine may desire to have the appliance carry through less than the full gamut of operations making up the most complex cycle of which the machine is capable. For example, it may be desired to place breakfast dishes in the dishwasher and give them a preliminary wash or rinse or both, reserving the full cycle of operations for a time when luncheon or perhaps dinner dishes may also be placed in the tableware racks of the appliance. To accomplish this, a knob is often affixed to the timer shaft so that the timer can be manually rotated through a portion or portions of its path of travel, thus by-passing certain of the appliance operations. In other instances, a rapid advance motor is provided, to rotate the timer-actuated switch operating mechanism at a rapid rate through one or more portions of the cycle. The rapid advance motor can be manually actuated, and is sometimes made actuable by the timing device itself so that certain portions of the cycle can be automatically omitted.

The prior art embodiments of the general types described above are capable of satisfactory operation, but have a number of distinct disadvantages. For example, in some instances the timer has to be located adjacent the manually actuable dial and knob so that the timer placement within the appliance is limited. In other instances, the operator has to manipulate a large number of push buttons, switches or the like in order to obtain the desired cycle. These various hand-manipulated devices tend to detract from the asthetic appearance of the appliance. In addition, the appliance controller, being essentially mechanical in nature, is subject to wear and adjustment problems.

Recently, prior art workers have attempted to overcome these disadvantages through the use of solid state control systems. U.S. Pat. No. 3,464,673 is exemplary of such a system. However, such a system is dependent upon an RC analog timer circuit which is relatively expensive, is relatively inaccurate, is subject to aging and does not lend itself well to integrated circuit techniques. In addition, this system employs a ring counter and a stepping switch which are relatively inefficient from a logic standpoint. The logic for this system is implemented by means of elements which are relatively expensive and do not lend themselves well to integrated circuit techniques. Finally, such a system is limited in its application and does not lend itself well to extension to more complicated control strategies.

The electronic digital control system of the present invention is adapted to provide a versatility hitherto unobtainable; to eliminate the disadvantages enumerated above; and to provide the advantages charteristic of electronic devices. For example, the control system of the present invention permits greater complexity and sophistication, greater reliability, lower cost, and is not subject to aging. In addition, the control system elements may now be located near the machine functions they control. Finally, the control system of the present invention facilitates controlling an appliance cycle on the basis of outputs from a number of low-power remote sensors, as opposed to controlling the cycle solely on the basis of elasped time.

SUMMARY OF THE INVENTION

The control system of the present invention is particularly adapted to control the actuation of a plurality of machine functions in a cyclical or sequential manner such that during one cycle, any of the machine functions, or any combination of them, will be repeatedly turned on and/or off at certain predetermined times, or when externally applied signals reach certain predetermined levels. The control system comprises a control logic circuit which, through appropriate interfacing devices (when needed), controls the power to the various machine functions in desired order.

In its most basic form the control system of the present invention comprises a source of regularly spaced electrical pulses which drives a master counter in the form of a digital counter. The invention further includes a strategy logic comprising a decoding logic and a function control logic. Some or all of the outputs of the stages of the master counter are connected to the inputs of the decoding logic which partially or completely decodes some or all of the logical states of the master counter. The outputs of the decoding logic are connected to the inputs of the function control logic. The function control logic has a function control output for each unique machine function. It operates on the outputs of the decoding logic so as to provide a logical one at each function control output during those states of the master counter when it is desired that the corresponding machine function be actuated, and a logical zero at that function control output during all other states of the master counter. The function control outputs are connected directly to their respective machine functions or, where needed, through appropriate interfacing devices.

Of the above listed elements, the decoding logic and function control logic comprise the strategy logic which, combined with the master counter, comprises the control logic for the control system of the present invention. The system will further include means for providing power for the control logic, the machine functions and, if necessary, the interfacing devices. In instances where a machine function may be powered directly from the control logic an interfacing device need not be used.

In one specific embodiment of the control system of the present invention a source of regularly spaced electrical pulses drives a master counter comprising a frequency divider and an events control counter. Some or all of the outputs of the stages of the events control counter are connected to the strategy logic comprising a decoding logic and a function control logic. The decoding logic comprises a plurality of event initiating gates. The function control logic comprises a plurality of activation and deactivation gates and a function control flip-flop for each unique machine function. In this embodiment there is one event initiating gate corresponding to the beginning of each elementary event in the cycle. The event initiating gates drive the inputs of the activation and deactivation gates, which in turn drive the function control flip-flops. The function control flip-flops control the machine functions through interfacing devices or, where possible, directly.

In another embodiment of the invention, the source of regularly spaced pulses drives a master counter comprising a frequency divider and an events register. There is one state of the evnts register corresponding to each event in the cycle. Some or all of the outputs of the stages of the events register are connected to the strategy logic, again comprising a decoding logic and a function control logic. The decoding logic comprises a plurality of event decoding gates. The outputs of the event decoding gates are connected to the function control logic comprising a plurality of function control gates. These last mentioned gates control the machine functions through interfacing devices or (where possible) directly. Period control logic and period select logic are also provided in this embodiment whereby the event outputs of the event decoding gates may also set the period of the frequency divider portion of the master counter to the particular value desired for each event.

In yet another embodiment the source of regularly spaced pulses drives a master counter, again comprising a frequency divider and an events register. Again decoding logic and function control logic (comprising a strategy logic) are provided, the function control logic controlling the machine functions through interfacing devices where such devices are required. This embodiment is adapted to take advantage of the fact that a number of events are repeated a number of time during a cycle. Thus the decoding logic is so designed that the first number of stages of the events register comprise a repeated events register and the remaining stages of the events register comprise an operations register. This embodiment is further provided with state select logic, preset logic, period control logic, reset control logic, pulse source interrupt logic, overfill protection logic, etc, as will be described hereinafter.

As suggested above, the control system of the present invention may incorporate a number of special features, applicable to all of the embodiments of the logic control circuit. One such feature is a pulse source interrupt, whereby control of the appliance may be relinquished to external sensors or signals. Means may be provided whereby the rate of advance of certain stages of the master counter can be increased so that, for example, the duration of a cycle may be shortened. Means may also be provided whereby the digital counter may be made to instantaneously assume any one of a number of predetermined states.

Finally, the invention contemplates the provision of efficient means for implementing the digital control logic; for providing power to the control logic; for interfacing between the control logic and the various machine functions where necessary; and for starting and stopping the control system.

BRIEF DESCRIPTION OF THE DRAWINGS

FIG. 3 is a logic diagram illustrating another embodiment of the control system of the present invention.

FIG. 4 is a logic diagram illustrating another embodiment of the control system of the present invention.

FIG. 5 is a logic diagram of the pulse source interrupt feature of the present invention.

FIGS. 21–25 illustrate the Truth Table for the embodiment of FIGS. 15 and 16.

DESCRIPTION OF THE PREFERRED EMBODIMENTS

1. The Overall System

Figure 1:
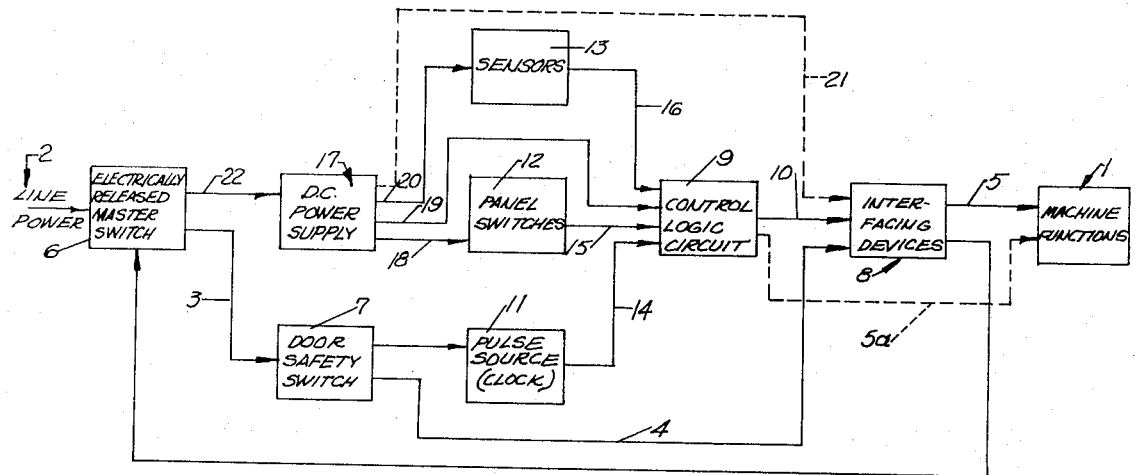
FIG. 1 is a block diagram of the overall control system of the present invention.

FIG. 1 is a block diagram illustrating the complete control system of the present invention. As indicated above, for purposes of an exemplary showing the control system will be described in terms of its application to a dishwashing machine. The dishwashing machine accomplishes its purposes through the agency of the various machine functions such as a motor and one or more pumps, a heater, solnoid operated water valves, a blower, a general illuminant, various indicator means, a solnoid operated detergent dispensor and the like. All of these machine functions are of the on-off type and are generally indicated in FIG. 1 at 1. It is the purpose of the present invention to provide a control system such that the machine functions will be operated at the proper time and for the proper duration of time.

In their most usual form, the various machine functions are operated by ordinary alternating current. A source of line power (i.e. house current or the like) is generally indicated at 2. The connection of the machine functions to the line power is diagrammatically indicated by lines 3, 4 and 5. It will be noted that the machine functions are connected to the source of line power through a master switch 6, a door safety switch 7 and a plurality of interfacing devices generally indicated at 8. When switches 6 and 7 are closed the line current will energize the appropriate machine function at the appropriate time upon actuation of the appropriate interfacing device.

The interfacing devices (and hence the machine functions) are controlled by the control logic circuit 9, as is indicated by line 10. The control logic circuit performs logical operations on information received from a source of regularly spaced electrical pulses 11, panel switches 12 and sensors 13, as indicated by lines 14, 15 and 16 respectively. The control logic circuit generates outputs which activate and deactivate the several machine functions 1 in desired timed sequence, via the interfacing devices 8, where interfacing devices are needed. Where interfacing devices are not needed, the machine functions will be controlled directly by the control logic circuit, as indicated by dashed line 5a.

A direct current power supply is generally indicated at 17. This serves as a power supply for the control logic circuit both directly and through the sensors and panel switches, as is indicated by lines 18, 19 and 20. It may also serve as a direct current supply for the interfacing devices (as indicated by dashed line 21), when interfacing devices requiring such a power supply are used. The power supply 17 may also serve as a source of direct current for the starting circuit of the dishwasher pump motor. The pump motor starting circuit does not constitute a part of the present invention. Such circuits are taught, for example, in the copending application Ser. No. 22,552, filed Mar. 25, 1970, now abandoned in favor of continuation-in-part application Ser. No. 147,506, filed May 27, 1971 in the names of Paul R. Scheuer, Victor H. Zane and Steven B. Sample, and entitled STARTING CIRCUIT FOR INDUCTION MOTOR.

In instances where the power supply 17 is not needed as a source of direct current for the interfacing devices 8, the only DC power required in the entire system is the very small amount needed to operate the logic control circuit and the motor starting circuit. For this reason, a simple non-inductive power supply, driven directly from the line, may be used. Such a power supply will be described hereinafter. For purposes of an exemplary showing, the DC power supply 17 is illustrated in FIG. 1 as connected by line 22 to the line power 2 through the master switch 6.

The master switch 6 is intended to serve two purposes. First of all, it comprises a means for applying power to the appliance at the beginning of each cycle. Secondly, it comprises a means for interrupting all power to the appliance at the end of each cycle.

The dishwasher operator must close the master switch intentionally at the beginning of each cycle. Thereafter, the master switch will remain closed until the end of the cycle whereupon it will be opened by the control system itself, thereby interrupting all power to the appliance and thus precluding any further action on the part of the appliance until the operator again intentionally closes the switch.

Excellent results have been achieved through the use of a master switch of the mechanically-latched, electrically-released type. An exemplary form of such switch is taught in the copending application Ser. No. 63,488, filed Aug. 13, 1970, now U.S. Pat. No. 3,673,531 issued June 27, 1972 in the name of Victor H. Zane, and entitled ELECTRICALLY RELEASED LATCHING SWITCH FOR TIMER-CONTROLLED APPLIANCES AND THE LIKE. Briefly, the switch comprises an element movable between an "on" position and an "off" position, and mechanically biased to its "off" position. When moved to its "on" position, the switch element is maintained there by a bimetallic latch means. The bimetallic latch means has a heater coil wrapped thereabout. Upon completion of a cycle, a signal from the control logic circuit, via an appropriate interfacing device (as indicated by line 5b in FIG. 1) causes the heater coil to be energized and the bimetallic latch means to be distorted, releasing the switch element to its "off" position. When in its "off" position, the switch disconnects all power to all parts of the appliance, including the heater coil about the bimetallic latch means.

The door safety switch 7 acts to interrupt the progress of the appliance cycle, and to deactivate those machine functions controlled through interfacing devices, whenever the dishwasher door is opened. This is accomplished by virtue of the fact that the safety door switch is in series with the main power bus that drives both the source of regularly spaced electrical pulses 11 and the interfacing devices 8. It will be noted, however, that the DC power supply 17 is not connected through the safety door switch. Therefore, opening the dishwasher vat door will inhibit the advancement of the timing logic (by having interrupted the pulse source 11), but the counters in the control logic circuit will maintain their states, since the DC power supply is not disconnected. Therefore, when the door is closed again and the door safety switch 7 is closed, the cycle will resume at exactly the same point at which it was interrupted.

The precise nature of the door safety switch does not constitute a limitation on the present invention. Such switches are well known in the art. For example, the safety door switch may comprise a part of the door latch mechanism, as taught in U.S. Pat. Nos. 3,210,490 and 3,323,822.

Instead of interrupting the line power to the pulse source 11 and the interfacing devices 8, the door safety switch could accomplish its aforestated purposes by providing a logical signal from the DC power supply 17 to the control logic circuit 9 which would cause the latter to activate a clock interrupt circuit (described hereinafter), thereby interrupting progress of the appliance cycle, and would also cause the control logic circuit to logically deactivate some or all of the machine functions.

As indicated above, one of the advantages of the control system of the present invention is the fact that it may be responsive to various types of sensing devices, rather than being dependent strictly upon elasped time.

The sensors 13 may be of any suitable and well known type, and the number of them does not constitute a limitation on the present invention. For example, a thermostat may be provided to sense the temperature within the dishwasher vat and to cause delay of the progress of the cycle by interrupting the source of regularly spaced electrical pulses 11 until the proper temperature is achieved within the vat.

The number and type of panel switches 12 again does not constitute a limitation on the present invention. They may include, for example, cycle select switches, a cancel cycle switch, a temperature selection switch, etc. In the above mentioned copending application Ser. No. 63,488, the cancel cycle switch and the cycle select switches are combined with the master switch 6. Therefore, actuation of any of the cycle select switches (other than the cancel cycle switch) will cause the master switch to close.

The source of regularly spaced electrical pulses 11, hereinafter referred to as the "clock," may take any suitable form. For example, it may comprise a local oscillator or multivibrator, or it could consist simply of circuits that rectify and/or shape and/or are synchronized by the sinusoidal power-line current. The period of the clock (TC) is defined as the time interval between succeeding clock pulses.

The clock pulse or signal comprises the fundamental timing signal for the entire control system. As a consequence, it has been found preferable to provide a clock wherein this fundamental timing signal is derived from the 60 Hz line frequency. The circuitry for such a clock is well known in the art, lends itself well to integration, is not subject to aging and is very precise. With such a clock circuit the precision with which any part of the cycle is measured is one-sixtieth of a second.

The interfacing devices 8 enable the low power outputs from the control logic circuit to control the line power to the various machine functions. The interfacing devices may take various forms including electromechanical relays, vacuum tubes, transistors, vacuum tubes driving electromechanical relays, transistors driving electromechanical relays, unidirectional thyristors, unidirectional thyristors driving electromechanical relays, bidirectional thyristors, and bidirectional thyristors driving electromechanical relays. While the present invention is not so limited, a preferred form of interfacing means will be described hereinafter.

The control logic circuit 9 may take many forms. While not intended to be so limited, the control logic circuit 9 is preferably an integrated circuit of the metal-oxide-semiconductor (MOS) type.

Since the various machine functions are of the on-off type, the control logic circuit will be considered in terms of binary digital logic, although the invention is by no means limited to binary logic. The two distinct states of binary logic will be referred to as logical zero and logical one. For purposes of an exemplary showing, the several parts of the invention dealing with digital logic will be illustrated using convenient combinations of certain well known binary logic components including AND gates, OR gates, NAND gates, NOR gates, inverters, flip-flops, counters and shift registers. The present invention need not be limited to the particular exemplary illustrations, as will be understood by one skilled in the art and as will be shown hereafter. For purposes of convenience, every trigger flip-flop used in the exemplary illustrations will be considered as changing state when the trigger input makes a transition from logical one to logical zero.

The control logic circuit is such that for a particular configuration of logical ones and/or logical zeros at its inputs (corresponding to a particular configuration of panel switch positions, sensor states, etc.), the control logic circuit will exhibit logical ones or logical zeros at its various outputs (corresponding, respectively, to the activation and deactivation of the various machine functions 8) in the particular temporal sequence desired for the particular input configuration.

As indicated above, each cycle which the dishwasher is capable of performing is made up of a sequence of elementary events. As indicated above, these events may be grouped for convenience into intermediate divisions of a cycle known as operations. With respect to the control logic circuit, each event may be considered an interval, at the beginning of which various machine functions may be activated or deactivated, but during the remainder of which the states of the various machine functions remain unchanged. The control logic circuit 9 is so devised that it counts the number of clock periods which make up the time length of each event. The logic control circuit advances through a set of internal states corresponding to the desired sequence of events, causing logical ones to appear at those machine function outputs which are to be switched on during each event. In addition, based on the logical inputs from the panel switches 12 and sensors 13 the logic control circuit 9 deletes, adds and changes the time length of various events, thereby providing for a number of different cycles and control strategies, as will be described hereinafter.

As indicated above, if the clock pulses are derived from the 60 Hz line frequency, the precision with which any part of the cycle may be defined is one-sixtieth of a second. This is far more precise than is needed in practice and therefore the practical precision with which the duration of any event is measured will be defined as the resolution time (TR). The resolution time (TR) is chosen to be some integral power (NR) of two, multiplied by the clock period. The amount of error that can be tolerated in the timing of an individual event will be designated the error time (TA). The error time (TA) is chosen to be some integral power (NA) of two, times the clock period. The concept of an error time is necessary because, for example, every time the clock is interrupted (such as occurs when the door safety switch 7 is opened) an error can be introduced on the order of up to one clock period (TC). In most cases, the error time (TA) is less than the resolution time (TR) and hence (NA) is less than (NR). From the above it is obvious that it would be inadvisable to make the clock period (TC) equal to the resolution time (TR). Under such circumstances the error time (TA) could be equal to the resolution time (TR), which would mean that an error could be introduced which would result in the loss of an entire event or a substantial part thereof.

2. General Description of the Control Logic

Figure 2:
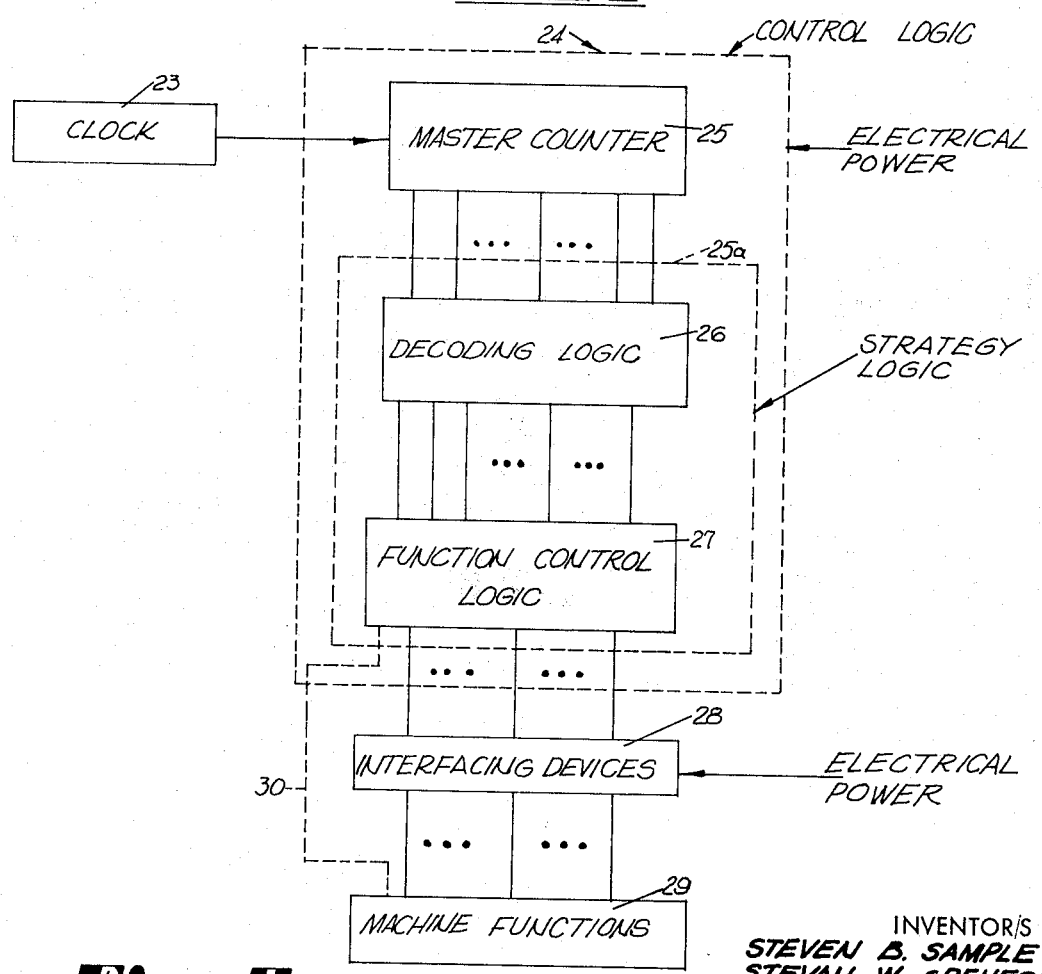
FIG. 2 is a diagrammatic representation of the basic embodiment of the control system of the present invention.

FIG. 2 illustrates the control logic circuit of the present invention in its most basic form. A source of regularly spaced electrical pulses, or clock, is illustrated at 23 and is equivalent to the clock 11 described with respect to FIG. 1. The control logic generally indicated at 24 is equivalent to that shown at 9 in FIG. 1. The control logic comprises a master counter 25, and a strategy logic 25a. The strategy logic comprises a decoding logic 26 and a function control logic 27. FIG. 2 also illustrates interfacing devices 28 and machine functions 29, equivalent to the interfacing devices 8 and machine functions 1 of FIG. 1.

In this basic embodiment, the clock 23 drives the master counter, which may be in the form of a digital counter. Some or all of the outputs of the stages of the master counter are connected to the inputs of the decoding logic 26, which partially or completely decodes some or all of the logical states of the master counter 25.

The outputs of the decoding logic are connected to the inputs of the function-control logic 27. The function-control logic has a function-control output for each unique machine function. If the appliance is provided with two or more functions which are always on and always off at the same time, such functions are considered non-unique.

The function control logic comprises means for acting on the outputs of the decoding logic in order to provide a logical one at each function-control output during those states of the master counter when it is desired that its corresponding machine function be actuated, and a logical zero at that function-control output during all other states of the master counter.

The outputs of the function-control logic 27 are connected to the machine functions 29 through appropriate interfacing devices, as described with respect to FIG. 1.

The groups of three dots between the outputs of the master counter, the outputs of the decoding logic, the outputs of the function control logic and the outputs of the interfacing devices are simply to indicate that in each instance there may be far more outputs than are illustrated in FIG. 2. It will also be noted that the function-control logic 27 is illustrated as having at least one output 30 (shown in dotted lines) leading directly to the machine functions 29. This is intended to respresent the fact that some low power machine functions (such as certain types of indictor means) may be driven directly by the function-control logic, without the interposition of interfacing devices.

Finally, as indicated in FIG. 2, a source of power must be provided for the control logic and for the machine functions (through the interfacing devices where used). The source of power for the control logic and the machine functions need not be unique from each other. However, when integrated control logic is used, it will normally be powered by a DC power supply. Generally, machine functions of the type associated with dishwashing machines and the like are powered by line current.

3. A First Embodiment of the Control Logic

An exemplary and simple form of control logic circuit is illustrated in FIG. 3. As in the embodiment of FIG. 2, a clock, corresponding to the clock 11 of FIG. 1, is illustrated at 31. Again a master counter is generally indicated at 32. As before, this embodiment includes a strategy logic comprising decoding logic generally indicated at 33 and a function-control logic generally indicated at 34. Interfacing devices (if required) are generally indicated at 35 and exemplary machine functions are shown at 36, 37 and 38.

The master counter 32 must be capable of counting clock periods from zero to NC, where NC is the number of clock periods in the longest cycle to be performed by the dishwasher. As a consequence, the product of NC and TC (the clock period) is equal to the maximum total measured time of the longest dishwasher cycle. The number of stages in the master counter, denoted by NT, is equal to the integer next larger than log-base-2 of NC.

As shown in the diagram, the master counter stages are divided into two groups. One group is designated the frequency divider 39 and comprises NR stages. The other group is designated the events control counter 40 and comprises (NT − NR) stages, i.e. the total number of stages minus the first NR stages. While, for purposes of an exemplary illustration, three stages 41–43 are illustrated in the frequency divider, the three dots between stages 42 and 43 are intended to indicate that additional stages may be present. The period of the frequency divider (i.e., the length of time between successive logical one-zero transitions of the output of stage 43) is by definition equal to the resolution time, every timed event being an integral multiple of this period. Therefore, the desired resolution time will determine the number of stages in the frequency divider.

The event control counter 40 is illustrated as having stages 44-47 therein. Again, the three dots between stages 46 and 47 are indicative that additional stages may be present. The number of stages in the event control counter is determined by the number of resolution times in the longest dishwasher cycle; thus the number of stages in this counter is equal to the integer next larger than log-base-2 of $[(NC \times TC) / (TR)]$.

The Q and $\bar{Q}$ outputs of the stages of the event control counter are connected to the inputs of a plurality of event initiating gates, comprising the decoding logic 33. As will be understood by one skilled in the art, the event initiating gates may be either AND or NOR gates. For purposes of an exemplary illustration, AND gates 48-52 are shown. FIG. 3 indicates that additional event initiating gates may be present and it will be understood that there will be one such gate for every event. The number of inputs each event initiating gate has will depend upon the number of stages in the event control counter 40.

The event initiating gates are driven by the stages of the event control counter and are so arranged that the output of one and only one of the gates 48-52 makes a logical zero to logical one transition at the beginning of each event (i.e., the output of exactly one event initiating gate makes a logical zero to logical one transition each time it is desired to activate and/or deactivate one or more of the machine functions). The inputs of the event initiating gates are so connected to the outputs of the event control counter that the output of each event initiating gate remains logical one for only TR seconds. Thus, it is impossible for the outputs of two event initiating gates to be logical one at the same time.

As indicated above, FIG. 3 illustrates three machine functions 36, 37 and 38. It will be understood that the normal dishwashing machine will have more than three machine functions.

Each of the machine functions 36, 37 and 38 is controlled by a set-reset flip-flop, known as a function-control flop-flop. There will be a function-control flip-flop for each unique machine function. The function-control flip-flops for machine functions 36, 37 and 38 are shown at 53, 54 and 55 respectively. Each function-control flip-flop 53, 54 and 55 operates in such a manner that its respective machine function is actuated if and only if the Q output of the flip-flop is logical 1.

A plurality of activation and deactivation gates are shown at 56-61. These may take the form of multipule-input OR gates. There will be an activation gate and a deactivation gate for each of function-control flip-flops 53, 54 and 55. Therefore, function-control flip-flop 53 is illustrated as having an activation gate 56 and a deactivation gate 57. In similar fashion, function-control flip-flop 54 is illustrated as having an activation gate 58 and a deactivation gate 59, while flip-flop 55 is provided with an activation gate 60 and a deactivation gate 61. It will be understood that the function control flip-flops and the activation and deactivation gates comprise the function-control logic 34.

Each of the activation gates 56, 58 and 60 will have a number of inputs equal to the number of times its respective function-control flip-flop is to turn its respective machine function on (i.e., the number of times its respective function-control flip-flop is to have a Q output of logical one). Each of the deactivation gates 57, 59 and 61 will have a number of inputs equal to the number of times its respective function-control flip-flop is intended to turn its respective machine function off, (i.e. the number of times its respective function-control flip-flop is intended to have a Q output of logical zero). Normally, the activation and deactivation gates for each function-control flip-flop will have equal numbers of inputs. Finally, the inputs of the activation and deactivation gates will be connected to the outputs of the appropriate ones of the event initiating gates 48-52 so that the various events of the cycle will take place in the proper sequence and for the required duration of time.

The operation of the control logic circuit of FIG. 3 may be described as follows. In FIG. 3, adjacent each of the event initiating gates 48-52, there is indicated an event number and the state of the event control counter stages (i.e. the logical condition of the Q and $\bar{Q}$ outputs of the stages of the event control counter 40, which in turn is the binary representation of the number of elapsed resolution times (TR) or elapsed periods of the frequency divider 39) which will cause the output of the respective event initiating gate to make a logical zero to logical one transition to initiate the event. Thus, event initiating gate 48 will initiate event number 1 when the state of the event control counter is [0, 0, 0, . . . 0]. Similarly, event initiating gate 49 will initiate event number 2 when the stage of the event control counter is [1, 0, 1, . . . 0], i.e., after five resolution times (TR) or five periods of the frequency divider 39 have elapsed.

To illustrate this, it may be assumed that machine function 37 should be activated at the beginning of a particular event, which may be designated EN. It is further assumed that this event should be initiated when the event control counter stages reach a state represented by [0, 1, 0, . . . 1]. In FIG. 2, the event initiating gate 50 is illustrated as making a logical zero to logical one transition when the event control counter reaches this state. Therefore, the output of the event initiating gate 50 is connected to the input of activation OR gate 58. Similarly, the output of this activation OR gate is connected to the function-control flip-flop 54, which activates machine function 37. Thus, when the event control counter has counted the number of resolution times (TR) corresponding to the time desired for the beginning of event EN, the output of the event initiating gate 50 will go from logical zero to logical one. This causes the output of activation OR gate 58 to go from logical zero to logical one, thereby sending the Q output of flip-flop 54 to logical one and, as a consequence, activating machine function 37.

The machine function 37 will remain activated through all suceeding events (even though the outputs of event initiating gate 50 and activation OR gate 58 go back to zero after TR seconds) until another event initiating gate (corresponding to the beginning of a later selected event), connected to one of the inputs of the deactivation OR gate 59 of the flip-flop 54 of machine function 37, makes a logical zero to logical one transition.

For purposes of an exemplary showing it may be assumed that the machine function 37 should operate until the initiation of event EM, i.e., until the event control counter displays the state [0, 0, 1, . . . 1]. In FIG. 3, event initiating gate 51 makes a logical zero to logical one transition at this state of the event control counter 40. Therefore, its output is connected to the deactivation OR gate 59 of flip-flop 54. Thus, at this state of the event counter 40 the Q output of flip-flop 54 will reset to logical zero and machine function 37 will be deactivated.

From the above example, it will be seen that by properly choosing the states of the event control counter at which the outputs of the various event initiating gates make their logical zero to logical one transitions, and by properly connecting the outputs of the event initiating gates to the inputs of the various activation and deactivation OR gates, it is possible to activate and deactivate the various machine functions in any combination and in any time sequence. As a result, it is possible with the control logic circuit of FIG. 3 to generate any desired cycle for the dishwashing machine.

4. A Second Embodiment of the Control Logic

FIG. 4 is a logic diagram illustrating another embodiment of the control logic circuit 9 of FIG. 1. FIG. 4 shows a master counter 61; a strategy logic comprising a decoding logic 62, a function control logic 63, a period-control logic 74 and a period-select logic 75; interfacing devices 64; and exemplary machine functions 65–67. Again the master counter 61 has two parts, but in this instance the parts comprise a frequency divider 68 and an events register 69. The frequency divider 68 is driven by a pulse source or clock 70 (which may be similar to the clock 11 of FIG. 1). The frequency divider 68 is illustrated as having three stages 71–73, but (as indicated in FIG. 4) it may have any required number of stages. The frequency divider 68 must be capable of counting the clock pulses from zero to NI, where NI is the number of clock pulses in the longest event. Thus the value of NI will determine the number of stages in the frequency divider 68.

In its natural state, the frequency divider 68 will make exactly one logical one-zero transition for every NI clock pulses, i.e. for every (NI)·(TC) seconds (where TC is the time interval between succeeding clock pulses, as described above). Thus (NI)·(TC) is equal to the period of the frequency divider 68.

Means are provided for shortening the period of the frequency divider 68, i.e., for decreasing the number of pulses from the clock 70 necessary to cause the output of the frequency divider 68 to make a logical one-zero transition. These means are generally indicated at 74 and are designated "period-control logic." Two exemplary forms of period-control logic (counter-stage bypass and/or state-initiated reset) will be described hereinafter. The period-control logic, itself, is activated by a plurality of period select gates generally indicated at 75. For purposes of an exemplary showing, four such gates are illustrated at 76–79 in the form of OR gates, although (as indicated in FIG. 4) more such gates may be provided, as required.

The output of the frequency divider 68 is connected, as at 80, to the input of an events register 69. The events register may be in the form of a shift register, or in the form of a binary counter as illustrated. When in the form of a binary counter, the events register 69 will have a sufficient number of stages to enable it to count the logical one-zero transitions of the frequency divider output from zero to NE, where NE is the maximum number of events in any of the dishwasher cycles. Thus, the first NE states of the events register 69 will each correspond to exactly one event. Any additional states the events register may have will be unused. For purposes of an exemplary showing, the events register is illustrated as having four stages 81–84. However, as is indicated in FIG. 4, additional stages may be required.

The Q and $\bar{Q}$ outputs of the events register are connected to the decoding logic 62. While not so limited, the decoding logic may comprise a plurality of event decoding gates in the form of AND gates. When AND gates are used, they will be equal in number to the maximum number of events in any of the cycles. Thus, there will be NE AND gates. For purposes of an exemplary showing the decoding logic is depicted as comprising AND gates 85–88. It will further be understood that when the events register takes the form of a shift register the decoding logic 62 may be eliminated.

The outputs of the decoding logic 62 will be appropriately connected to the inputs of the function-control logic 63. For purposes of an exemplary showing the function-control logic is illustrated as comprising a plurality of multiple-input function control gates. For purposes of an exemplary showing, these are illustrated as OR gates. The outputs of the function control gates will, in turn, be connected to the various machine functions through the interfacing devices 64, when necessary. Again, for purposes of an exemplary showing, three machine functions 65–67 are illustrated. There will be a function-control gate for each machine function and for purposes of an exemplary showing three function-control gates are illustrated at 89–91.

It will further be noted that the outputs of the decoding logic 62 may also be appropriately connected to the multiple-input period-select gates 76–79 so that the duration of each event may be appropriately controlled.

The operation of the embodiment illustrated in FIG. 4 may be described as follows. As indicated above, the events register 69 will have a series of sequential states corresponding to each event. Similarly, the decoding logic 62 will have an output corresponding to each event.

If it is desired that a particular machine function 66 be activated during a particular event EN, and if it is desired that event EN extend for a particular time interval TM, then the event output of the decoding logic 62 coresponding to EN (i.e., the output of event decoding gate 87) will be connected to one of the inputs of the function control gate 90, which controls machine function 66. The same event output of the decoding logic will also be connected to one of the inputs of the period-select gate 78, corresponding to a period of TM seconds. When event EN is reached in the cycle, machine function 66 will be activated and will remain activated until the frequency divider 68 makes it next logical one-zero transition which will occur after TM seconds have elapsed. Thus, by properly connecting the event outputs of the decoding logic 62 to the inputs of the several period-select gates and function-control gates, it is possible to activate and deactivate the various machine functions in any combination and in any time sequence. Thus, it is possible to generate any desired cycle.

In the embodiment of the control logic circuit illustrated in FIG. 3, it will be noted that the first NR stages of the master counter 32 determine the period of the frequency divider 39. In addition, the period of the frequency divider 39 remains invariable. In this embodiment a given event may extend through several states of the event control counter 40, where each state of the event control counter extends for TR seconds. The event control counter has a far greater number of states than the number of events to be performed by the dishwashing machine. Not all of the states of the event control counter are decoded, and those which are decoded are not necessarily contiguous.

In the embodiment of FIG. 4 there is exactly one output of the decoding logic 62 for each event. Exactly one of these outputs is logical one at any given instant, and this logical one appears sequentially at the decoding logic outputs. In this embodiment each event extends through exactly one state of the events register 69 and each state of the events register extends for exactly the length of time required for the event to which it corresponds, as determined by the period-select logic 75 and the period-control logic 74.

5. Special Logic Features

There are a number of special logic features which are applicable to all of the embodiments of the present invention. These special logic features will now be described.

A. Clock Interrupt

The first of these features will hereinafter be referred to as the "clock interrupt" feature. In general the clock interrupt feature provides means for interrupting the flow of clock pulses into the master counter or for interrupting the the flow of trigger pulses from one stage of the master counter into the next stage, thereby inhibiting any change in state in any succeeding stages of the master counter.

At a certain time or times in a cycle, it may be desired that the progress of a cycle be delayed (i.e., that the overall state of the appliance remain unchanged) until such time as the output of a sensor, such as a thermostat, changes its state. For example, if the vat of a dishwasher has been filled with wash water, it may be desired to interrupt further progress of the cycle until a heating means has brought the wash water to a desired temperature. When the desired temperature is reached, the output of a thermostat or other suitable sensor will change its state and the cycle will proceed as usual. The clock interrupt feature may also be used to interrupt a cycle while the appliance door is open assuming that the door safety switch provides a logical signal to the control logic circuit to activate the clock interrupt feature (as described above). The clock interrupt feature may again be used to prevent further advancement of the master counter at the end of each cycle.

An example of how the clock interrupt feature might be implemented is illustrated in FIG. 5 wherein a clock 92 and a binary counter 93 are shown. It will be understood by one skilled in the art that the clock 92 may represent any of the clocks of FIGS. 2–4. Similarly, the binary counter 93 may represent the master counter of FIGS. 2, 3 or 4.

In this particular implementation, the clock interrupt feature is accomplished by stopping the flow of pulses from the clock 92 to the master counter 93. A two-input AND gate 94 is located between the clock and the master counter. The output of the AND gate 94 is connected to the input of the master counter and one of the inputs of the AND gate is connected to the clock. The other input of the AND gate 94 is driven by the output of a multiple-input NOR gate 95.

It will be understood by one skilled in the art that if any input of NOR gate 95 is logical one, the output of the NOR gate will be logical zero. This, in turn, will cause the output of AND gate 94 to be logical zero, thereby preventing the clock pulses from reaching the counter 93. Similarly, if all of the inputs of NOR gate 95 are logical zero, its output will be logical one, as will be the output of AND gate 94, and the clock pulses will be transmitted to the counter 93. The various inputs of NOR gate 95 may be connected to any suitable signal sources. Examples of such signal sources are event initiating gates, event outputs, external switches, sensors, or logical combinations of the signals from such sources. Thus, the signal from any such source can interrupt the progress of the counter 93 simply by activating one of the inputs of NOR gate 95.

B. Preset and Reset

Another feature of the present invention will hereinafter be referred to as the "preset" feature. This feature takes a number of forms and comprises a means by which all or a part of the master counter of FIGS. 2–4 can be made to instantly assume any desired predetermined state.

Figure 6:
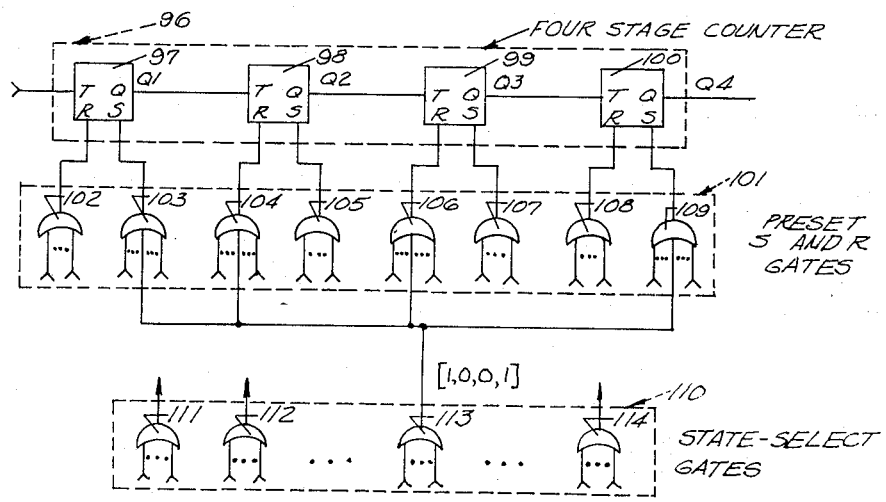
FIG. 6 is a logic diagram of the preset feature of the present invention.

FIG. 6 illustrates an exemplary embodiment of the preset feature in its most general form. A four stage binary counter is generally indicated at 96, having stages 97–100. The binary counter 96 may be all or part of the master counter of FIGS. 2–4.

A series of preset gates are generally indicated at 101. They are illustrated as a plurality of OR gates. It will be noted that there is a preset gate for each set and reset input of each of the counter stages 97–100. The set and reset inputs of the stages are designated by R and S, respectively. The preset R gates are indicated at 102, 104, 106, and 108. The preset S gates are indicated at 103, 105, 107 and 109.

The inputs of the preset gates 102–109 are driven by the outputs of a number of state-select gates, generally indicated as a plurality of OR gates at 110. The number of such state-select gates will depend upon the number of states to which it is desired to preset the counter 96. Four state-select gates are indicated at 111–114.

An exemplary operation of the present feature may be described as follows. If it is desired to preset counter 96 to a state which may be represented as [1, 0, 0, 1], then one of the state-select gates 111–114 should have its output connected to one of the inputs of preset gates 103, 104, 106 and 109. State-select gate 113 is illustrated as being so connected. Thus, when any one of the inputs of state-select gate 113 is logical one, the counter 96 will be immediately set to the state [1, 0, 0, 1].

In order to initiate the preset feature, the inputs to the state-select gates 111–114 may be driven by signals from any number of sources such as: panel switches, circuits internal to the control logic, sensors, event initiating gates, event outputs, function control logic, and the like, or by logical combinations of signals from these sources.

For example, signals driving the inputs of the state-select gates may be derived from the cycle select switches controlled by the operator of the dishwashing machine. In such an instance, the preset feature could be used to insure that the various digital counters of the control logic are in their proper states at the beginning of each cycle. In most applications of the preset feature to the master counter of FIGS. 2–4, only those stages following the first NA stages (where NA is the integral power used to determine the error time) need be preset. This is true because uncertainties in the states of the first NA stages will induce timing uncertainties that are less than or equal to the allowable error time (TA).

For purposes of definition only, a special case of the preset feature, hereinafter referred to as "reset," will be said to obtain whenever the feature is used to preset every stage of the counter (or every stage of a particular segment of the counter) to logical zero.

C. State-Initiated Preset

An additional special case of the preset feature, hereinafter referred to as "state-initiated preset," obtains whenever the presetting signal is logically derived from the state of the same counter that is to be preset. However, in such cases precautions must be taken to avoid a logical race condition, i.e. to prevent the disappearance of the presetting signal before the counter in question has been fully preset. Basically, the situation requires that there be a small delay (TD) between the time at which the initiating state output (i.e., one of the decoding logic outputs of FIGS. 2–4) makes its logical one-zero transition, and the time at which the presetting signal at the input to one of the state-select gates 111–114 makes its logical one-zero transition.

The amount of delay necessary will depend upon the particular physical electronic circuit chosen to implement the logic. In some cases there may be sufficient delay inherent in the physical circuit itself. In other cases, additional components (such as an even-numbered chain of capacitively-loaded inverters, or the like) may be required in order to insure sufficient delay.

Figure 7:
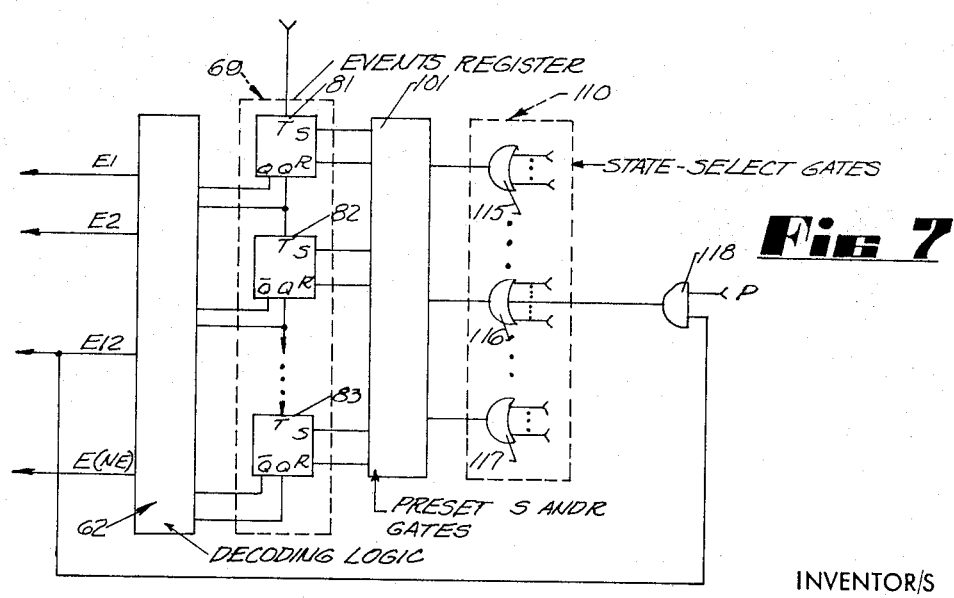
FIGS. 7–9 are logic diagrams illustrating the state-initiated preset feature of the present invention.

One application of state-initiated preset occurs when it is desired to delete a part of a cycle. FIG. 7 illustrates one possible way in which this feature might be applied to the logic circuit of FIG. 4. In FIG. 7, the events register 69 of FIG. 4 is illustrated, together with the decoding logic 62. The Figure also shows in diagrammatic form the preset gates 101 of FIG. 6. The outputs of these gates are connected to the set and reset inputs of the events register stages. Finally, the state-select gates 110 of FIG. 6 are illustrated, and for purposes of an exemplary showing three state-select gates are shown at 115–117. The Figure contains an AND gate 118, the output of which is connected to one of the inputs of state-select gate 116. One of the inputs of AND gate 118 is connected to the event output of the decoding logic 62, corresponding to event E 12. The other input of AND gate 118 is connected to a suitable signal source P.

The logic diagram of FIG. 7 provides for the deletion of events E 12 through E 19 inclusive, whenever a logical one appears at input P of AND gate 118. For example, events E 12 through E 19 may represent the second rinse operation in a cycle; thus by actuating a panel switch which produces a logical one at P, the operator can delete the second rinse operation from the cycle. It will be noted that the output of the AND gate 118 is connected to the input of state-select OR gate 116 corresponding to event E 20. A suitable delaying circuit may be included in the last mentioned connection when necessary, as described above.

In operation, if a logical one appears at input P of AND gate 118, the output of this AND gate will be logical one as soon as the events register 69 reaches state E 12. At this point, the events register will immediately preset to state E 20, thus bypassing states E 12 through E 19 inclusive.

Figure 8:
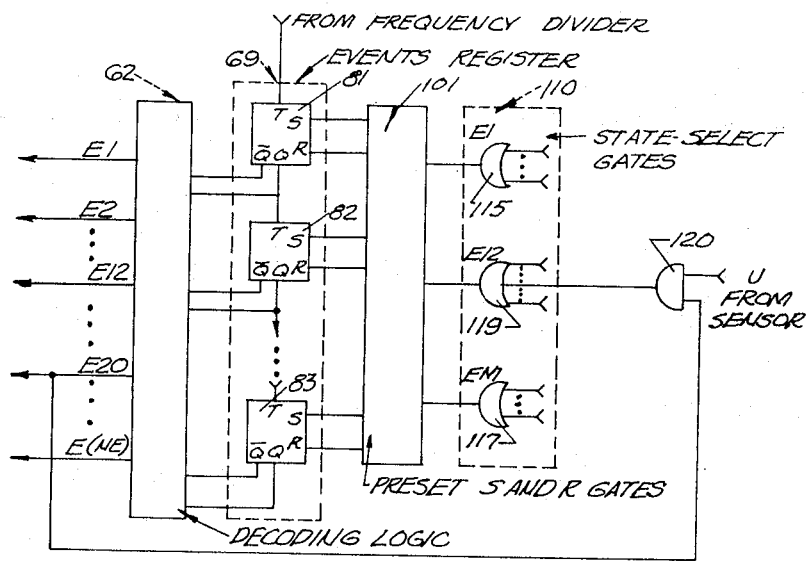

Another use for the state-initiated preset feature is to cause a part of a cycle to be repeated. However, in such cases precautions must be taken to avoid repetition ad infinitum. FIG. 8 is a logic diagram, similar to FIG. 7 (like parts having been given like index numerals), which illustrates the use of the state-initiated preset feature to repeat events E 12 through E 19.

AND gate 120 is equivalent to AND gate 118 of FIG. 7. One input of AND gate 120 is connected to the event output of the event decoding logic 62 corresponding to event 20. The other input of AND gate 120 is connected to a signal source U which may be a sensor or the like. The output of AND gate 120 is connected to that state-select gate 119 which corresponds to event E 12. Thus, whenever a logical one appears at U, and assuming the events register 69 progresses to event E 20, the events register will be immediately returned to the state corresponding to event E 12. The events register will continue to repeat events E 12 through E 19 until the condition is met that no logical one appear at U throughout event E 20.

This particular application of state-initiated preset might be used to repeat an operation in a cycle until such time as a certain condition has been met. For example, events E 12 through E 19 may comprise the second rinse operation, and it may be desired to repeat this operation over and over until a sensor connected to U indicates that all residue has been removed from the dishes.

D. State-Initiated Reset

A special case of state-initiated preset, hereinafter referred to as state-initiated reset, is useful for, among other things, decreasing the period of the frequency dividers of the embodiments of the present invention.

Figure 9:
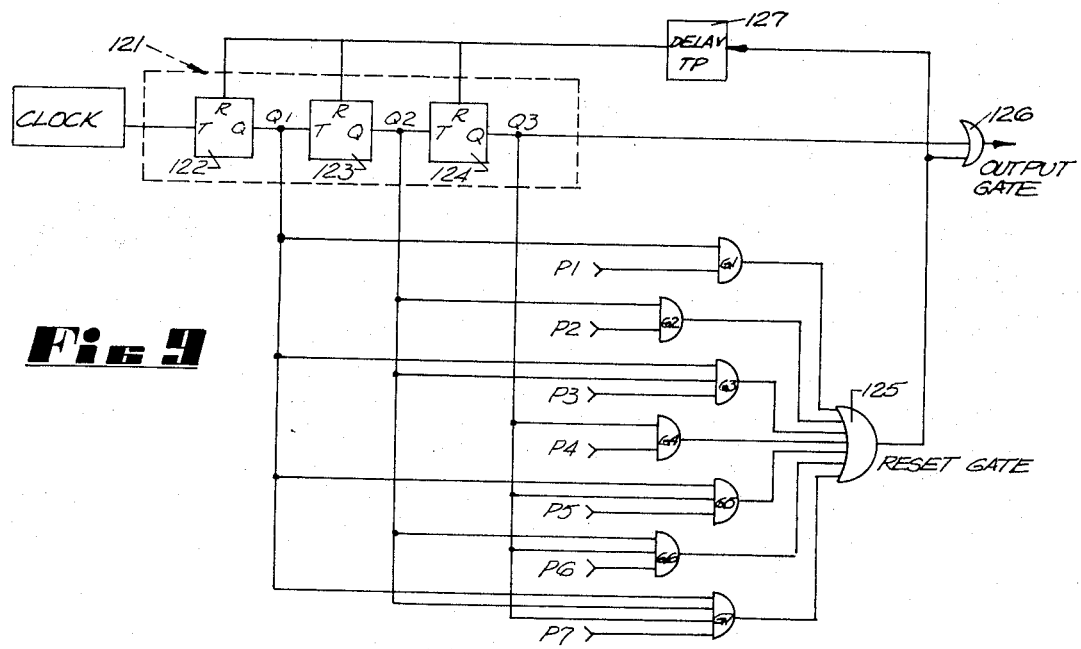

FIG. 9 illustrates one possible way in which state-initiated reset may be used as a means for varying the period of a three-stage frequency divider generally indicated at 121. The frequency divider is illustrated as having stages 122 through 124. In the embodiment shown in FIG. 9, the period of frequency divider 121 can be varied from one to eight clock periods.

Seven decoding gates, labled G 1 through G 7, are provided. All of the decoding gates G 1 – G 7 have one input connected to a suitable signal source. These inputs are designated as P 1 through P 7. Decoding gate G 1 has another input connected to the Q output Q 1 of stage 122. Gate G 2 has an input connected at the Q output Q 2 of stage 123. Gate G 3 has an input connected to each of the Q outputs of stages 122 and 123. Gate G 4 has an input connected at the Q output Q 3 of stage 124. Gate G 5 has an input connected to the Q outputs of stages 122 and 124. Gate G 6 has inputs connected to the Q outputs of stages 123 and 124, and finally, gate G 7 has inputs connected to the Q outputs of all three stages 122–124. It will be noted that the decoding requirement is significantly simpler than that imposed on the event initiating gates of FIG. 3 or the event decoding gates of FIG. 4. In this instance and for reasons which will be clear from what follows, all of the decoding can be accomplished with only the Q outputs of the counter stages 122–124.

The outputs of decoding gates G 1 through G 7 are connected to a seven-input OR gate 125, designated the "reset" gate. The output of the reset gate 125 drives one output of the two-input OR gate 126, designated the "output" gate. The output of reset gate 125 also drives the input of a delaying element generally indicated at 127 and having a time delay designated TP. The output of the delaying element 127 drives the reset inputs of counter stages 122–124. Finally, the output Q 3 of the third stage 124 of the counter drives the other input of the two-input OR gate 126, the output of which is construed to be the output of the frequency divider. The nature of the delaying element 127 does not constitute a limitation on the present invention. Any suitable and well known delaying element may be used.

The operation of the state-initiated preset circuit of FIG. 9 may be described as follows. First of all, if all of the P inputs are logical zero, the frequency divider 121 will simply operate in the normal manner. Thus the frequency divider output will make a logical zero-one transition for every four clock periods, i.e. 4 (TC). The frequency divider output will make a logical one-zero transition after eight clock periods, and thus the frequency divider exhibits one pulse 4 (TC) seconds wide for every eight clock pulses at the input, and thus the period is 8 (TC).

If input P 1 is logical one, and all of the other P inputs are logical zero, the logical one which appears at the output of decoding gate G 1 after one clock period (i.e., after TC seconds) will be transmitted to one of the inputs of reset gate 125. The reset gate transmits the logical one to the input of delaying element 127 and to the output of the frequency divider through output gate 126. After TP seconds (the delay time) the logical one will be transmitted by the delaying element to the reset input of each of the stages 122–124 and these stages will reset to logical zero. As a consequence, logical one will disappear from the output of decoding gate G 1, reset gate 125 and output gate 126. Thereafter, the entire process will be repeated. In this manner, a logical one at input P 1 causes the output of the frequency divider to exhibit one pulse TP seconds wide for every clock pulse at the input.

In similar fashion, if input P 2 is logical one, and all of the other P inputs are logical zero, the frequency divider will exhibit one pulse TP seconds wide for every two clock pulses. When input P 3 is logical one and all of the others are logical zero, the frequency divider output will exhibit one pulse for every three clock pulses, and so on for inputs P 4 through P 7. The frequency divider pulses will be TP seconds wise when a logical one is present at any one of inputs P 1 thorugh P 4. For input P 5, the frequency divider pulse will be TC + TP seconds wide. For input P 6, the frequency divider pulse will be 2 (TC) + TP wide, while for input P 7, the frequency divider pulses will be 3 (TC) + TP seconds wide.

The delay time TP is chosen, first, to be less than (TC/2); second, to be longer than TD (where TD is the delay time needed to properly effect state-initiated preset, and which, as described above, is a characteristic of the particular means used to implement the control logic); and third, so that the output pulses corresponding to P 1 – P4 will be sufficiently wide to properly trigger or excite the circuits connected to the output of the counter.

The application of the state-initiated reset of FIG. 9 to the embodiment of FIG. 4 will be readily apparent. The circuit of FIG. 9 may comprise the period control logic 74 of FIG. 4. In this instance, the P inputs of the state-initiated reset circuit will be connected to the outputs of the period-select gates 75 of FIG. 4.

In the embodiment of FIG. 3, the state-initiated reset feature might be employed during a particular part of a cycle to decrease the period of the frequency divider 39, thereby decreasing the time length of all events occurring during that part of the cycle. In this application the P 1 – P 7 inputs of FIG. 9 could be considered to be pseudo machine functions. Therefore, an additional function control flip-flop (such as flip-flops 53–55 of FIG. 3) could be provided for each P input of the circuit of FIG. 9. Each such function control flip-flop (serving in this instance as a period-control flip-flop) would have its S and R inputs connected to the outputs of activation and deactivation gates similar to those shown at 56–61 in FIG. 3.

Under these circumstances, the duration of a given sequence of events (say E 9 through E 17) could be decreased by a factor of M/8 (where M is any integer from 1 to 7) simply by connecting the output of that one of the event initiating gates 48–52 corresponding to the beginning of E 9 to one of the inputs of the activation gate for input PM, and by connecting the output of that one of the event initiating gates 48–52 corresponding to the beginning of event E 18 to the deactivation gate for input PM.

It will be clear to one skilled in the art that the techniques of state-initiated reset described above can be readily applied to a frequency divider comprising an arbitrary number of stages K, in order to achieve any period which is an integral multiple of the clock period from one clock period up to 2-power-K clock periods. If only one reduced period is desired, the reset gate 125 can be eliminated.

E. Divider-Stage Bypass

Another means for decreasing the period of the frequency divider of FIGS. 2 or 3 will hereinafter be referred to as the "divider-stage bypass" feature. Basically, this feature involves the logical circumvention of some of the stages comprising the frequency divider. Thus, if N stages are bypassed, the period will be decreased by a factor of 2-power-N. By making the bypassing of a given stage dependent, in part, on the states of subsequent stages, it is possible to vary the period of the frequency divider (by any integral number of clock periods) from one clock period up to the maximum period of the frequency divider, i.e., up to 2-power-K clock periods, where K is the total number of stages in the frequency divider.

Figure 10:
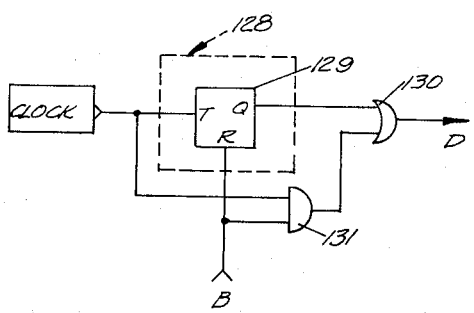
FIGS. 10 and 11 are logic diagrams illustrating the counter-stage by-pass feature of the present invention.

One possible embodiment of the divider-stage bypass feature is illustrated in its simplest form in FIG. 10. In this figure, a frequency divider (generally indicated at 128 and having a single stage 129) is shown along with the necessary logic components for bypassing the stage 129. The output of the frequency divider 128 is construed to be the output D of OR gate 130.

If the input at B is logical zero, output D makes a logical one-zero transition every two clock periods. Thus, the output D exhibits one pulse TC second wide for every two clock pulses at the input. If, on the other hand, input B is logical one, the clock pulses will be transmitted around the frequency divider stage 129 through AND gate 131 to one of the inputs of OR gate 130. At the same time, the logical one at B will appear at the reset input of stage 129 so that the Q output thereof is held at logical zero. Therefore, the output D simply exhibits the clock pulse train, and thus a logical one at input B induces a logical circumvention of the single stage of this frequency divider.

Figure 11:
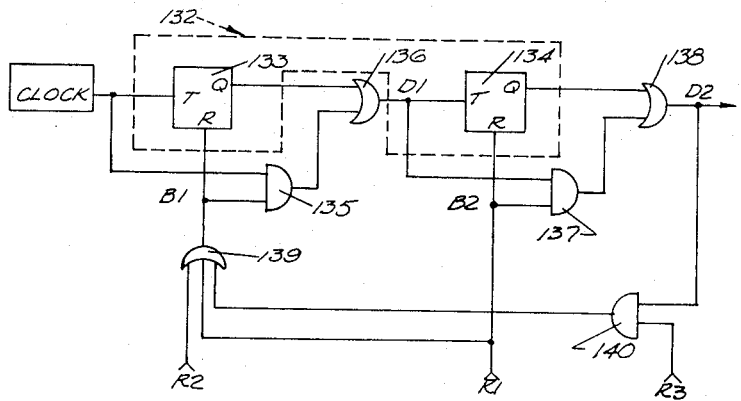

FIG. 11 illustrates one way in which this principle might be applied to a 2-stage frequency divider, generally indicated at 132. The frequency divider 132 has stages 133 and 134. The stage 133 is provided with an AND gate 135 and an OR gate 136 equivalent to AND gate 131 and OR gate 130, respectively, of FIG. 10. Stage 134 is similarly provided with an AND gate 137 and an OR gate 138. It will be readily apparent that a logical one at B 1 will cause the input to stage 133 to appear directly at D 1. Similarly, a logical one at B 2 will cause the input of stage 134 to appear directly at D 2, which is construed to be the output of the frequency divider 132.

Input B 1 is connected to the output of a three-input OR gate 139. One input of OR gate 139 is indicated at R 2. The other input is labled R 1 and is logically identical to B 2. The third input is connected to the output of a two-input AND gate 140. One of the inputs of AND gate 140 is connected to D 2. The other input is designated as R 3.

It will be apparent from the circuit of FIG. 11 that if a logical one appears at R 1, both stages will be bypassed and D 1 simply exhibits the clock pulse train. Under these circumstances, the period of the frequency divider will be one clock period.

If a logical one appears at R 2, the first stage will be bypassed and the period of the frequency divider will be two clock periods, i.e., D 2 will exhibit one pulse TC second wide for every two clock pulses at the input to the counter.

If a logical one appears at R 3, neither stage is bypassed for the first two clock pulses. However, after two clock pulses D 2 will be logical one and thus the first stage will be bypassed for the third clock pulse, causing the third clock pulse to appear directly at D 1. This, in turn, causes D 2 to make a logical one-zero transition. At this point both stages are again in the logical zero state and the process is repeated. Thus, a logical one at R 3 causes the period of the frequency divider 132 to be three clock periods, i.e. causes D 2 to exhibit one pulse TC seconds wide for every three clock pulses at the input. Finally, if all of the inputs R 1, R 2, R 3 are logical zero, neither of the stages is bypassed and the period of the frequency divider is four clock periods.

From the above discussion, it will be evident to one skilled in the art how the principle of divider-stage bypass can be applied to a frequency divider of an arbitrary number of stages K, in order to achieve complete variability of the period by intergral steps from 1 to 2-power-K clock periods.

6. Implementation of the Logic

The various logic elements just discussed (comprising the control logic indicated at 9 in FIG. 1) can be physically implemented in a number of ways. For example, any system of interacting bistable devices could be used including gears, cams, springs and levers; fluidics; electromechanical relays; vacuum tubes and resistors; discrete component transistors and resistors; and integrated circuits. While the manner of implementation is not intended to be a limitation on the present invention, the integrated circuit approach is believed to be the best from the standpoints of cost, size and reliability. Of the two basic types of integrated circuits (bipolar and metal-oxide-semiconductor) it is believed that the metal-oxide-semiconductor or MOS approach offers a number of advantages including lower cost per gate, greater fanout, higher element densities, lower power dissipation, and greater noise immunity.

MOS integrated circuits exhibit two disadvantages as compared with bipolar integrated circuits, i.e., slower speed and lower output power levels. With respect to typical appliance applications, however, speeds required are on the order of seconds, while even the slowest MOS circuits exhibit speeds on the order of microseconds, and thus the slower speed of MOS integrated circuits is not a drawback in this application. With respect to lower output power levels, interfacing devices requiring very low power levels have been developed, as will be described hereinafter, and thus the lower output power of MOS integrated circuits again does not constitute a drawback in this application. In practice, the MOS integrated circuit approach has proved highly successful as applied to the present invention. The entire control logic has been implemented on a single integrated circuit comprising a tiny, planar array of interconnected electronic circuit elements, each element being an integral part of the same thin silicon chip. This chip measures roughly 0.1 inch on a side, and contains approximately 600 circuit elements.

7. Interfacing Means

Figure 12:
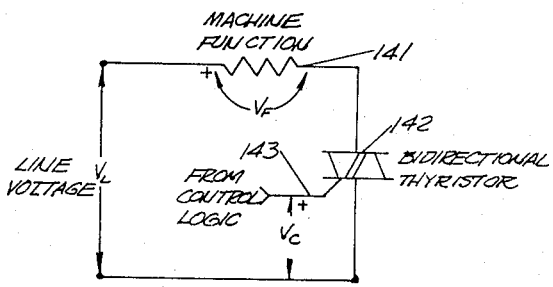
FIG. 12 is an electrical diagram illustrating the use of a bidirectional thyristor as an interfacing device between the control logic circuit and a machine function.

As indicated above, there are many methods of interfacing between the integrated logic circuit and the various machine functions, if in fact such interfacing devices are needed at all. An exemplary, but nonlimiting interfacing means is illustrated in FIG. 12. As shown in that figure, a particular machine function 141 is illustrated as connected across line voltage and in series with a bidirectional thyristor 142. When the gate 143 of the bidirectional thyristor 142 receives a logical one output from the control logic (in this case a positive voltage) the thyristor 142 will be triggered into conduction in both directions and thus full-wave line voltage will be applied to the machine function 141. When the output of the control logic is logical zero (in this case zero volts) the thyristor 142 will not conduct in either direction and hence no power is delivered to machine function 141.

Bidirectional thyristors can be triggered into conduction in both directions with either positive or negative gate signals. They can further be obtained in sizes capable of switching very high machine function currents and capable of withstanding extremely high starting currents characteristic of inductive machine functions. Further, their lack of moving parts minimizes the generation of electromagnetic interference. Such interference is further minimized by virtue of the fact that the bidirectional thyristors pass from the conducting state to the non-conducting state only when the instantaneous load current is essentially zero.

Special sensitive-gate bidirectional thyristors are available which can be successfully and reliably triggered directly with the very low power levels available from an MOS control logic chip without adverse effects on the latter, and which can handle load currents in the range of a few amps. Thus, lower current machine functions such as lights, solenoids, the blower motor and the like can be controlled directly from the chip through such sensitive-gate bidirectional thyristors. An example of a bidirectional thyristor which has been used is that designated as ECC type DMF (L2000K4), manufactured by ECC Inc.

Higher current functions such as the pump motor windings and the heater can be controlled through high current (10–20 amps) bidirectional thyristors, each of whose gates is connected to the load terminals of a low-current senitive-gate triac, which is in turn controlled directly from the control logic chip.

8. DC Power Supply

The DC power supply 17 (FIG. 1) for the control logic curcuit and for the interfacing devices (if necessary) can be provided by means of any number of circuits well known in the art. Such circuits generally incorporate one or more transformers or coils which tend to be bulky and expensive components. However, when sensitive-gate bidirectional thyristors are used as interfacing devices, no DC power is required for the interfacing devices, and hence the only DC power required in the entire system is the very small amounts needed to operate the control logic circuit 9 and a starting circuit for the dishwasher pump motor. Thus, it is feasible under these circumstances to use a simple, non-inductive power supply driven directly from the line.

Figure 13:
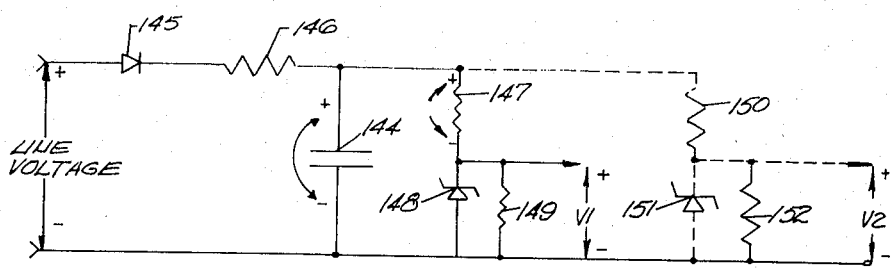
FIG. 13 is an electrical diagram illustrating an exemplary form of non-inductive direct current power supply for the control logic circuit and/or the interfacing devices.

FIG. 13 is an electrical diagram of an exemplary dual-level non-inductive regulated power supply which has been found to be entirely satisfactory for the control system of the present invention. in FIG. 13, current flows into capacitor 144 through diode 145 and resistor 146 during the first part of each positive half cycle. The capacitor 144 discharges during the remainder of the positive half cycle and during all of the negative half cycle, through resistor 147 and the parallel combination of zener diode 148 and load 149. The load 149 might represent the supply load of an integrated circuit, such as the control logic 9 of FIG. 1 and is not limited to being a linear resistor as shown.

Provided the voltage across the capacitor 144, minus the voltage across resistor 147, is always greater than the breakdown voltage of zener diode 148, the output voltage (indicated at V 1) will be held essentially constant at the breakdown voltage of zener diode 148. By properly choosing components 144, 146 and 147, a constant output voltage V 1 will be provided over a wide range of input line voltages and over a wide range of load 149. The circuit may be extended (as indicated in dotted lines) to include resistor 150, zener diode 151 and load 152 to produce a second regulated voltage V 2.

9. Start-Stop Subsystem

The control system of the present invention contemplates the incorporation of a start-stop subsystem. The start-stop subsystem has three purposes: first, to provide a means for applying power to the appliance at the beginning of each cycle; second, to provide a means for interrupting all power to the appliance at the end of each cycle; and third to generate a preset signal at the beginning of each cycle so that the control logic will be in the proper initial stage for the cycle chosen. The first two of these purposes may be accomplished by providing a master switch 6 (FIG. 1) of the electrically released type, as set forth above and described in the above mentioned copending application Ser. No. 63,488.

Figure 14:
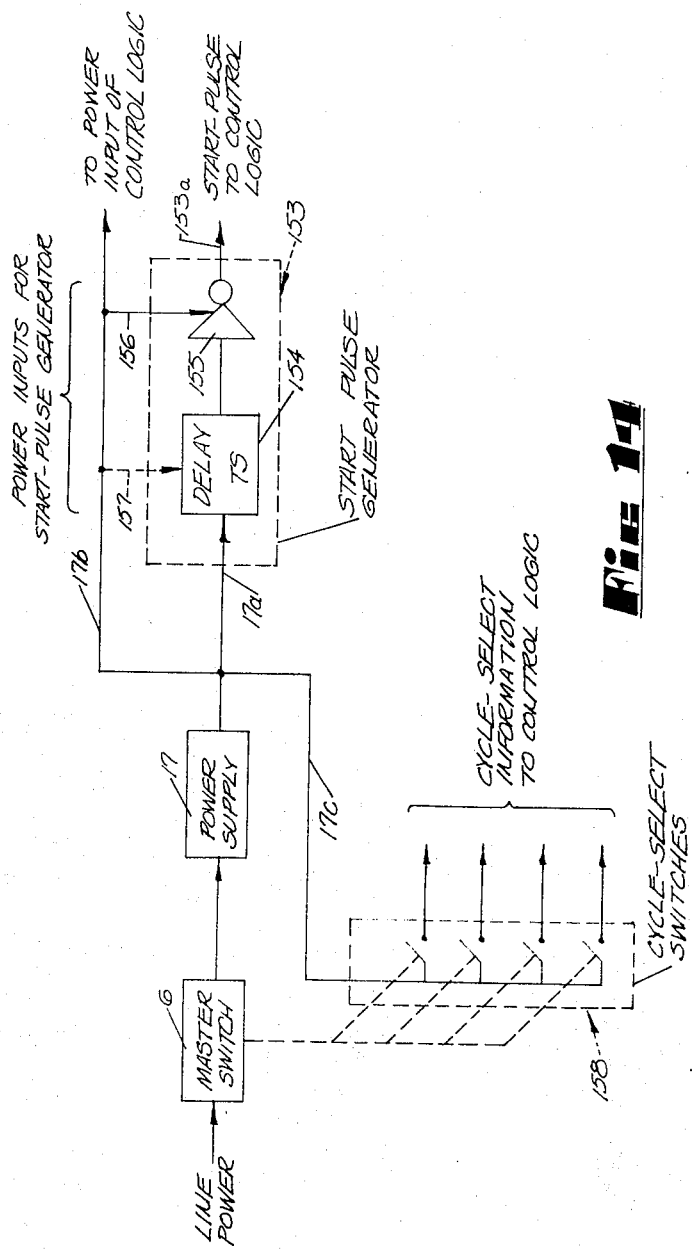
FIG. 14 is a block diagram illustrating an exemplary embodiment of the start-stop subsystem of the present invention.

The manner in which a preset signal is generated by the start-stop subsystem is illustrated in FIG. 14. In FIG. 14 the start-stop subsystem is illustrated as comprising the master switch 6 and DC power supply 17 of FIG. 1. One of the outputs 17a of the DC power supply 17 goes to a start-pulse generator, generally indicated at 153. The start-pulse generator comprises a delay circuit 154 and an inverter 155. It will be understood by one skilled in the art that the delay circuit 154 may be of any suitable and well known type. Another output 17b of the DC power supply provides the power inputs for the start-pulse generator 153. There is one such input indicated at 156 for the inverter. Another such input is indicated at 157 for the delay circuit. The input 157 is shown in dotted lines since some delay circuits do not require such an input. In addition, the DC power supply output 17b is also shown as going to the power input of the control logic 9 (FIG. 1). Finally, as indicated above, the master switch 6 and the various cycle-select switches and cancel-cycle switch can be combined into a single switching unit. This is indicated in FIG. 14, with the various cycle-select switches generally indicated at 158. It will be noted that the DC power supply 17 also supplies power via lead 17c to the various cycle-select switches 158 so that they may provide cycle-select information to the control logic, in accordance with which one of the cycle-select switches is closed.

To initiate operation of the dishwashing machine it will be necessary to close one of the cycle-select switches 158 and the master switch 6. When a switch unit of the type described above is used, closure of anyone of the cycle-select switches (not including the cancel cycle switch) will automatically close the master switch 6. Closure of the master switch will energize the DC power supply 17 and DC power will be provided to the control logic via lead 17b. Similarly, an appropriate cycle-select information signal will be sent to the control logic via lead 17c and that one of the cycle-select switches which was closed. The start-pulse generator 153 will be energized via inputs 156 and 157.

A signal from the DC power supply 17 is sent to the start-pulse generator 153 via lead 17a. The start-pulse generator being powered by the DC power supply 17, exhibits no output until the power supply 17 has reached its minimum acceptable output for circuit operation (at which instant it is presumed that the control logic circuits are fully in operation) whereupon the output 153a of the start-pulse generator will be logical one. This logical one comprises the start-pulse and is transmitted to the start input of the control logic. The start-pulse activates the proper preset and reset circuits in the control logic circuit in order to set the various counters to their proper initial states, as determined by the signal from the selected one of the cycle-select switches 158.

This logical one or start-pulse at 153a results from the fact that the output of the delay device 154 is initially logical zero and therefore the output of the inverter 155 is logical one. The logical one start-pulse at 153a is maintained for TS seconds (by means of the delay circuit 154). TS is chosen, first, to be greater than TD, and second, to provide a margin of safety against the possibility that the circuits in the start-pulse generator might be activated at a lower supply voltage (and, hence at an earlier time) than the circuits in the control logic. After the delay TS, the output of the delay device 154 will be logical one and the output of the inverter 155 will be logical zero, thereby terminating the start-pulse.

One feature of the start-stop subsystem of FIG. 14 is that, in the event of a line power failure during a cycle, followed by resumption of the line power, the control logic will be preset back to the beginning of the selected cycle. This is true because the start-pulse generator cannot distinguish between the closing of the master switch with the line power present (i.e. as would occur in the normal starting of the dishwashing machine), and resumption of line power after a power failure which occurs when the master switch is already closed. This feature is very important, for it is the nature of electronic counters and shift registers to lose track of their states (i.e., to exhibit no memory) when their source of power is cut off. Thus, without this feature, resumption of power after a power failure (with the master switch closed) might cause the control logic to exhibit some random state which is completely out of sequence with the state it exhibited at the time the power failed, and/or completely unrelated to the cycle it was performing. This, in turn, might cause improper, undesirable and unpredictable actions on the part of the appliance, which might lead to damage to the appliance or its contents.

10. A Complete Embodiment of the Control System

Figure 15:
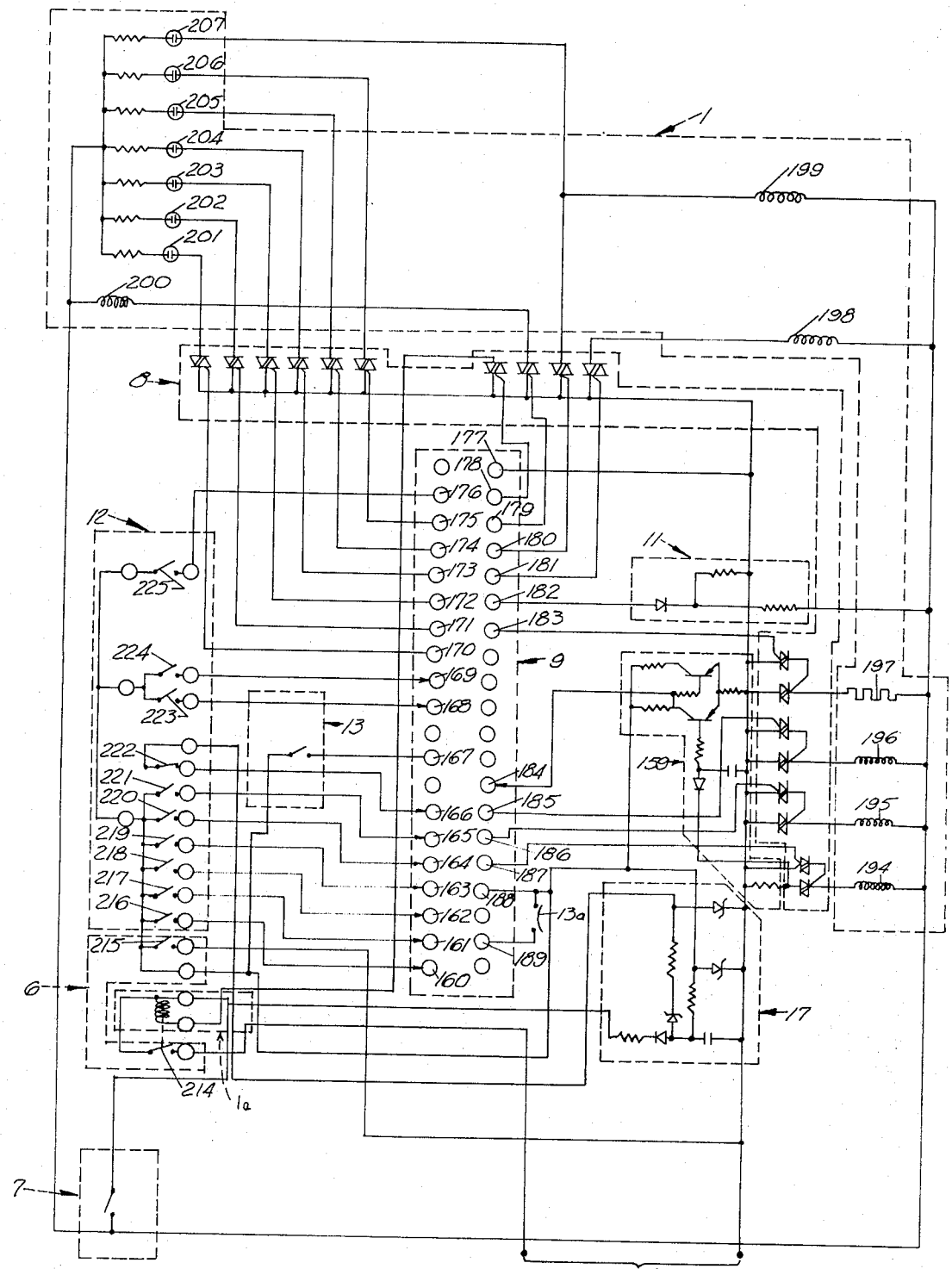
FIG. 15 is a circuit diagram illustrating yet another embodiment of the control system of the present invention.
Figure 16:
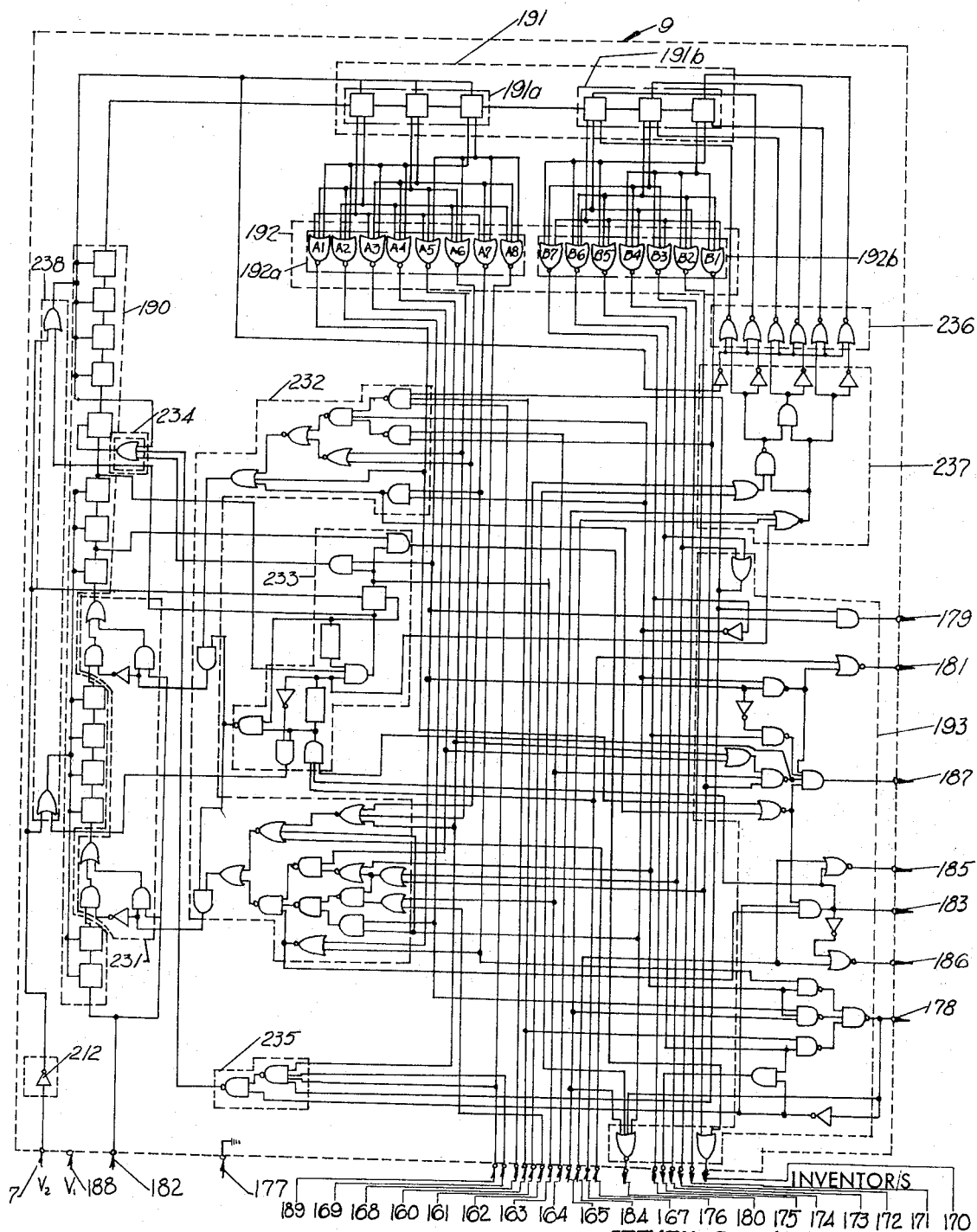
FIG. 16 is a logic diagram illustrating the control logic of the embodiment of FIG. 15.

Yet another embodiment of the control system of the present invention is illustrated in FIGS. 15 and 16. FIG. 15 is a diagrammatic representation of the overall control system, while FIG. 16 is a logic diagram of the control logic of FIG. 15. A dishwashing machine conforming to the embodiment of FIGS. 15 and 16 has been built and successfully tested.

For purposes of clarity, FIG. 15 will first be compared to FIG. 1. It will be noted that the various elements illustrated in FIG. 15 are separated in groups by a plurality of dashed lines. These groups are given the same index numerals as their counterparts in FIG. 1. Thus, the machine functions are shown at 1 and 1a, the interfacing devices at 8, the control logic at 9, sensor means at 13 and 13a, panel switches at 12, the clock at 11, the DC power supply at 17, the door safety switch at 7 and the electrically released master switch at 6. In addition, a motor starting circuit is illustrated at 159. The motor starting circuit does not constitute a part of, or a limitation on, the present invention, and is taught in the above noted copending application Ser. No. 22,552.

As indicated above, FIG. 16 illustrates the logic control circuit 9 of FIG. 15. The various logic control circuit inputs and outputs are numbered 160 through 189 in FIG. 15. The same inputs and outputs are similarly numbered in FIG. 16.

While the invention is not intended to be so limited, the control logic circuit of FIGS. 15 and 16 is illustrated in a form suitable for implementation as a MOS integrated circuit in a standard 40 pin package. The logic control circuit 9 of FIGS. 15 and 16 has been successfully implemented in the form of a planar array of interconnected electronic circuit elements, each element being as integral part of the same thin silicon chip measuring roughly 0.1 inch on a side. This particular embodiment requires only 30 pins to serve as inputs or outputs, the remaining pins (unnumbered in FIG. 15) not being used.

The logic circuit of FIG. 16 conforms to the control logic illustrated at 24 in FIG. 2. For purposes of clarity, the various logic elements have been illustrated in groups surrounded by dashed lines. The control logic circuit 9 comprises a master counter 190 and 191, a decoding logic 192 and a function control logic 193, equivalent to the master counter 25, the decoding logic 26 and the function control logic 27 of FIG. 2. It will be understood that the decoding logic 192 and the function control logic 193, considered together, are equivalent to the strategy logic 25a of FIG. 2.

Returning to FIG. 15, the machine functions 1 and 1a are illustrated as comprising a main motor winding 194, a forward start winding 195 and a reverse start winding 196. The machine functions further include a heater 197, a water valve 198, a blower motor 199, a detergent cup and rinse agent injector 200, a master switch release means 226–227 (see FIG. 20) and a plurality of indicator lights 201 through 207.

The interfacing devices, generally indicated at 8, are shown simply as a plurality of bidirectional thyristors. The interfacing devices for the main motor winding 194, the start windings 195 and 196 and the heater 197 are shown as "slaved," each of these functions being controlled by a high current bidirectional thyristor whose gate is connected to the load terminals of a low-current sensitive-gate bidirectional thyristor controlled directly from the logic control circuit chip 9. It will further be noted the the blower motor 199 and indicator light 207 comprise a pair of non-unique machine functions, as described above. Therefore, these two machine functions require but a single interfacing device and a single logic control circuit output (indicated at 180).

The clock 11 is illustrated in the form of a typical and well known circuit adapted to attenuate and rectify the sinusoidal power line voltage.

While the number of sensors does not constitute a limitation on the present invention, the embodiment of FIG. 16 contains two. The first is illustrated at 13 and comprises a mechanical float switch to sense the water level in the dishwasher vat. The second sensor 13a comprises a thermostatic switch whereby the water temperature in the vat is sensed.

The door safety switch 7, as described with respect to FIG. 1, may take any suitable form, and acts to interrupt the progress of the appliance cycle and, in this embodiment, to deactivate all machine functions whenever the dishwasher door is opened. Line power for the dishwashing machine is indicated at 208.

A. Dual Level DC Power Supply

FIG. 15 illustrates a DC power supply 17 which is not only dual level, but also is characterized by the fact that the lower level voltage is automatically delayed with respect to the higher level voltage. As will be shown hereinafter, this enables the elimination of a delaying circuit (such as that shown at 154 in FIG. 14) in the start-pulse generator since the required delay is provided by the power supply itself.

Figure 17:
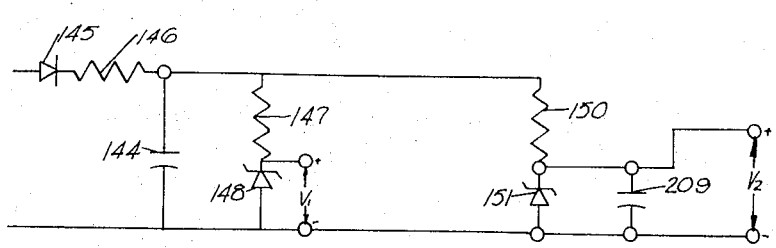
FIGS. 17 and 18 are electrical diagrams illustrating modified forms of non-inductive direct current power supplies.
Figure 18:
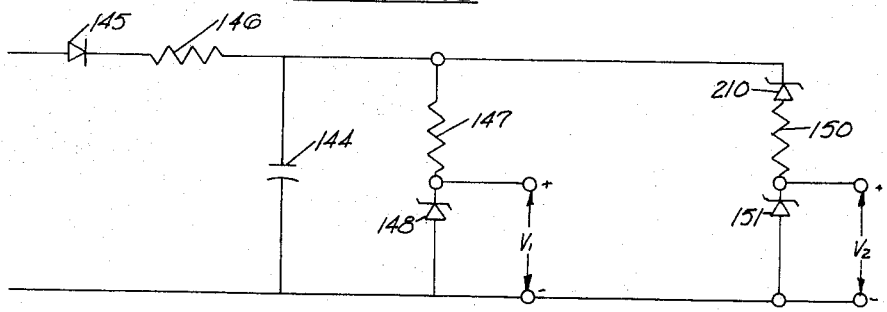

Two exemplary DC power supplies, providing such a delay, are illustrated in FIGS. 17 and 18. Turning first to FIG. 17, it will be noted that it is quite similar to the DC power supply illustrated in FIG. 13, and like parts have been given like index numerals. The operation of the DC power supply of FIG. 17 is substantially the same as that described with respect to FIG. 13. However, the provision of capacitor 209 will assure that voltage V 2 will be established after voltage V 1 by the amount of time it takes for capacitor 209 to charge. Proper selection of the components will enable the provision of the required delay time.

FIG. 18 illustrates another DC power supply again providing a delay between the lower voltage V 2 and the higher voltage V 1. Again, like parts have been given the same index numerals as in FIG. 13. The DC power supply of FIG. 18 is identical to that illustrated at 17 in FIG. 15.

In this last mentioned embodiment, it will be understood that the lower voltage V 2 will not appear until the break-over level of zener diode 210 has been reached. The diode 210 is chosen to have a break-over level such that as the power supply is turned on, V 2 is less than V1 by an amount which will cause proper operation of the start-pulse generator.

B. Start-Pulse Generator

Figure 19:
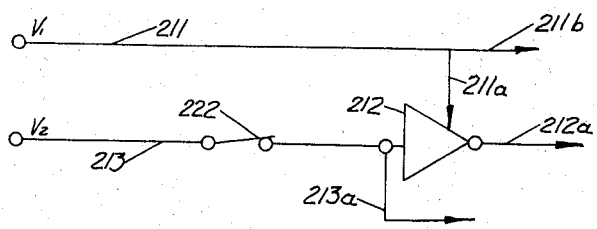
FIG. 19 is a logic diagram illustrating another embodiment of the start-stop subsystem.

FIG. 19 illustrates the start-pulse generator of the start-stop subsystem in the embodiment of FIGS. 15 and 16, to be used with a power supply of the type show in FIG. 17 or 18. It will be noted that the start-pulse generator is similar to that shown in FIG. 14, except that the delay circuit 154 of FIG. 14 has been eliminated. In the diagram of FIG. 19, lead 211 carries the high voltage V 1 from the DC power supply. This voltage is used to power inverter 212 (equivalent to inverter 155 of FIG. 14) as is indicated at 211a. The voltage V 1 is also used to power portions of the control logic, as indicated at 211b. Lead 213 carries the lower voltage V 2 from the DC power supply. Again, a portion of the lower voltage V 2 is used to power parts of the control logic (indicated at 213a), as will be described hereinafter.

Since, as described above, the establishment of the required voltage V 2 takes place after the establishment of voltage V 1, upon closing the master switch 6, the inverter 212 will have a logical one output at 212a, constituting the start pulse. Once voltage V 2 has been established, the output of inverter 212 will be logical zero and the start pulse at 212a will be terminated. It will be noted from FIG. 16 that the inverter 212 may constitute a part of the MOS chip. FIG. 16 also indicates the inputs to the chip for the voltages V 1 and V 2 at 188 and 167, respectively.

C. Master Switch and Panel Switches

Returning to FIG. 15, the master switch 6 and panel switches 12 are illustrated as comprising master switch 214, ground switch 215, cycle select switches 216 through 220, cancel cycle switch 221, momentarily open switch 222, temperature select switches 223 and 224 and dry time select switch 225.

Figure 20:
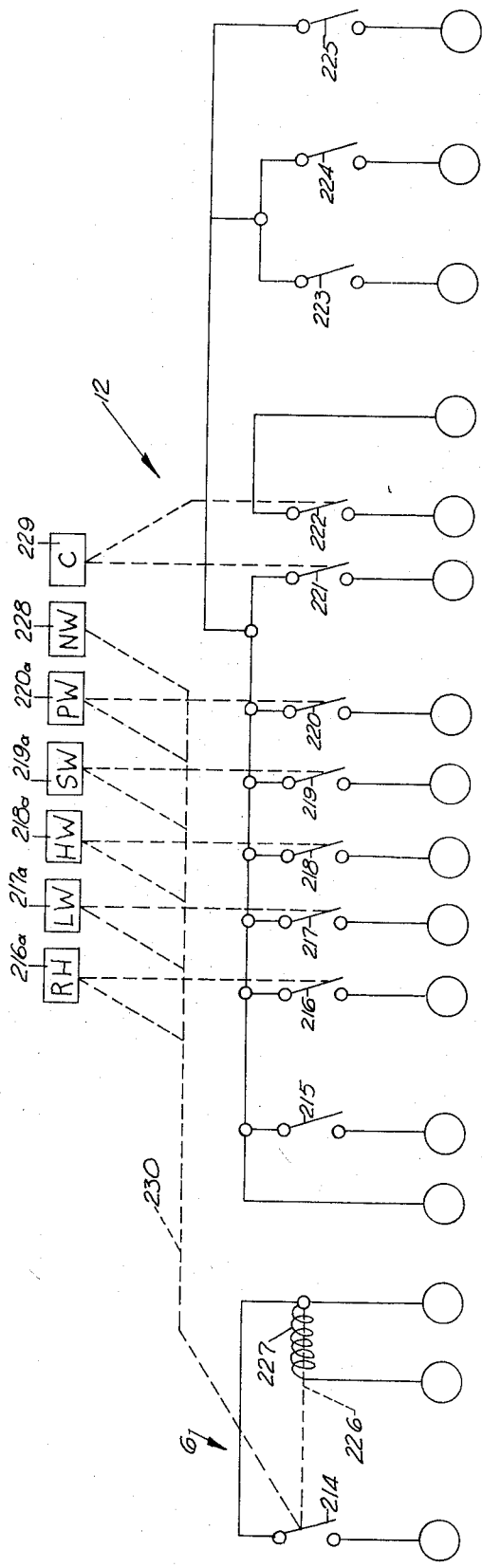
FIG. 20 is a diagrammatic representation of the master switch and panel switches of FIG. 15.

The master switch and panel switches of FIGS. 15 are more clearly shown in FIG. 20, where like parts have been given like index numerals. All of the switches 214 through 222 may be a part of a single switch unit of the type previously described with respect to the above mentioned copending application, Ser. No. 63,488. Thus, the switch 214 of master switch 6 is illustrated as being of the mechanically-latched, electrically-released type. The dashed line 226 is intended to be a diagrammatic representation of a bimetalic latch or a solenoid core such that when switch 214 is closed it will be held closed by the element 226. A coil is shown at 227. When the latch 226 is a bimetalic latch, the coil 227 is a heater coil, which when energized, causes the bimetalic latch 226 to distort and release the switch 214. When the latch 226 comprises the core of a solenoid, the coil 227 comprises the solenoid coil which, when energized, causes the core 226 to release or open the switch 214. The elements 226 and 227, taken together, comprise one of the machine functions.

The switch 215 is a ground switch. Through appropriate mechanical means, the switch 215 is normally open when the master switch 214 is closed, and is normally closed when the master switch 214 is open. The purpose of the ground switch 215 is to permit the DC power source to discharge so that it can be properly energized upon demand.

It will be understood by one skilled in the art that the number of cycles and their nature does not constitute a limitation on the present invention. For purposes of an exemplary showing, the embodiment of FIGS. 15 and 16 is illustrated as capable of initially providing the operator with six cycles from which to chose, as will be described more fully hereinafter. The cycles may be designated as follows: Rinse and Hold, Light Wash, Heavy Wash, Super Wash, Plate Warm and Normal Wash. For example, push button 216a permits the selection of the Rinse and Hold Cycle. Depression of push button 216a causes the closure of cycle select switch 216 so that an appropriate cycle select signal will be sent to the control logic 9 to cause the machine to perform the Rinse and Hold Cycle. Similarly, push button 217a selects the Light Wash Cycle and actuates cycle select switch 217. Push buttons 218a, 219a and 220a, enable the selection of the Heavy Wash, Super Wash, and Plate Warm Cycles, and actuate cycle select switches 218, 219 and 220, respectively. The Normal Wash Cycle is selected by means of push button 228. It will be noted that this push button does not operate a cycle select switch. This is true because the control logic 9 is so designed as to perform the Normal Wash Cycle upon closure of the master switch, unless a cycle select signal is received through closure of any one of cycle select switches 216 through 220.

Dashed line 230 diagrammatically illustrates that all of the push buttons 216a through 220a and 228 are linked to the master switch 214 so that depression of any one of these push buttons will cause the master switch to close. This is the reason for the provision of the Normal Wash push button 228. Although it does not control a cycle select switch, depression of the Normal Wash push button will cause the master switch to be closed. As indicated above, closure of the master switch will energize the start pulse generator. Thus, upon depression of any one of the cycle select switches 216 through 220 and 228, the master switch will be closed, the start pulse generator will be energized, and upon termination of the start pulse the cycle will begin.

The dishwasher is also provided with a push button 229 by which the operator can terminate a previously selected cycle at any time during the operation of that cycle by initiating a Cancel Cycle. The push button 229 operates cycle select switch 221.

All of the push buttons of FIG. 20, are of the mutually exclusive type, i.e. only one push button may be depressed at any given time. Depression of any one of the push buttons will cause the previously depressed push button to return to its normal position.

It will be noted that the Cancel Cycle button 230 is not linked to the master switch 214. Thus, unlike the remaining cycle select push buttons, depression of the Cancel Cycle button will not result in the closing and latching of the master switch 214. Since the Cancel Cycle button 230 is intended to terminate a cycle previously selected, it will be understood that the Cancel Cycle button will be depressed at a time when the master switch 214 has already been closed and latched. As a result, the Cancel Cycle button 230 is designed to have an over-travel whereby a normally closed switch 222 will be momentarily opened. As indicated in FIG. 19, the normally closed momentary switch 222 is located in the lead 213 to the inverter 212. Thus, depression of Cancel Cycle button 230 will momentarily open the switch 222. This will disconnect the V 2 power to the logic control circuit chip thereby causing the output of the start-pulse generator to be logical one. This start-pulse causes the control logic to be instantly preset to the proper initial state for the Cancel Cycle and when momentary switch 222 is again closed the Cancel Cycle will proceed. Thus, momentary switch 222 provides the start-pulse for the Cancel Cycle.

The panel switches 223, 224 and 225 constitute separate switches and are not a part of the switch unit comprising switches 214 through 222. The exemplary embodiment of FIGS. 15 and 16 is capable of operating under three distinct temperature modes. Switches 223 and 224 comprise temperature select switches. If both of these switches are open, there will be no thermostat delay and the dishwasher will operate in the normal temperature mode. If switch 224 is closed by the operator, the dishwashing machine will operate in the 150°F mode wherein a thermostat delay will be imposed during the second wash and fourth rinse operations until the water in the dishwasher vat reaches at least 150°F (as determined by temperature sensor 13a). If the operator closes switch 223, the dishwasher will operate in the hot mode. Under these circumstances, if the water in the vat is less than 150°F (as determined by sensor 13a), a thermostat delay of not more than eight digital minutes will result during the second wash and fourth rinse operations. Thus, the hot mode provides a practical trade-off between water temperature and heating time.

For purposes of an exemplary showing, the embodiment of FIGS. 15 and 16 is illustrated as capable of providing two distinct dry times. Switch 225 is a dry time select switch. When the switch is open, the dishwashing machine functions with a normal dry time of 11 digital minutes. When the switch is closed, the dry time is extended via the period-select logic to 20 digital minutes, as will be described hereinafter. It can be seen from the above that 30 distinct cycles can be selected by virtue of combinations of the six selectable cycles, the three temperature modes and the two dry times. Through the use of multiple contact switches it would be possible to obtain the 30 distinct cycles by employing fewer switch contacts.

D. Truth Tables

Figure 21:
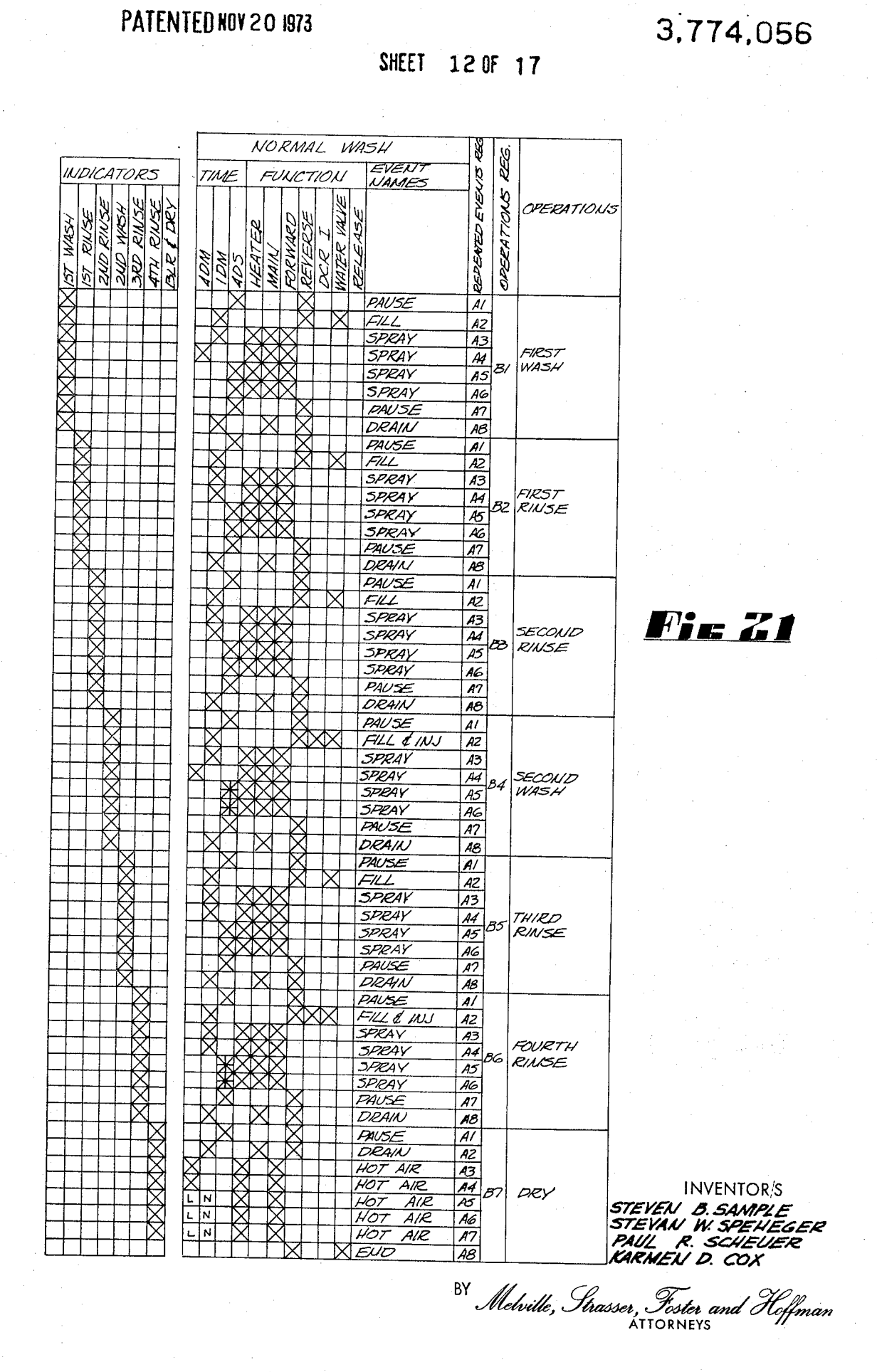

FIGS. 21 through 25 comprise the Truth Table for the embodiments of FIG. 15 and 16. FIG. 21 comprises the Truth Table for the Normal Wash Cycle. Under the heading "NORMAL WASH," the right-handmost column names all of the events comprising the Normal Wash Cycle. It will be noted that the cycle comprises 56 events. As will be shown hereinafter, not all of the cycles use all 56 events.

The 56 events may be grouped into groups of eight events designated A 1 through A 8. There are seven such groups of events and each of the seven groups comprises an operation. The operations are designated B 1 through B 7. Finally, in the right-handmost column of FIG. 21 the operations are named as follows: first wash, first rinse, second rinse, second wash, third rinse, fourth rinse and dry.

Beneath the heading "NORMAL WASH" there is a column for each of the machine functions (except the indicator lights and the blower motor) including the heater, the main motor winding, the forward motor winding, the reverse motor winding, the detergent cup and rinse agent injector, the water valve and the release means for the master switch. When an "X" appears in a particular machine function column opposite a particular event, this means that the machine function will be actuated during that event.

To the left of the machine function columns there is a column for each of the three possible time lengths an event may have. These time lengths are given in terms of digital time, as will be described hereinafter, and comprise four digital minutes, one digital minute and four digital seconds. For each event there will be an "X" in one of the three time columns, indicating the time length of that event.

On the left side of FIG. 21 there are seven columns, one for each indicator light. With a few exceptions, there is one unique indicator light on during each operation, irrespective of the cycle. One exception is during the Pumpout Cycle, wherein the first wash light blinks throughout the cycle. Another is the Cancel Cycle, during which all lights are off. Finally, during any end event there will be no indicator lights on.

Figure 22:
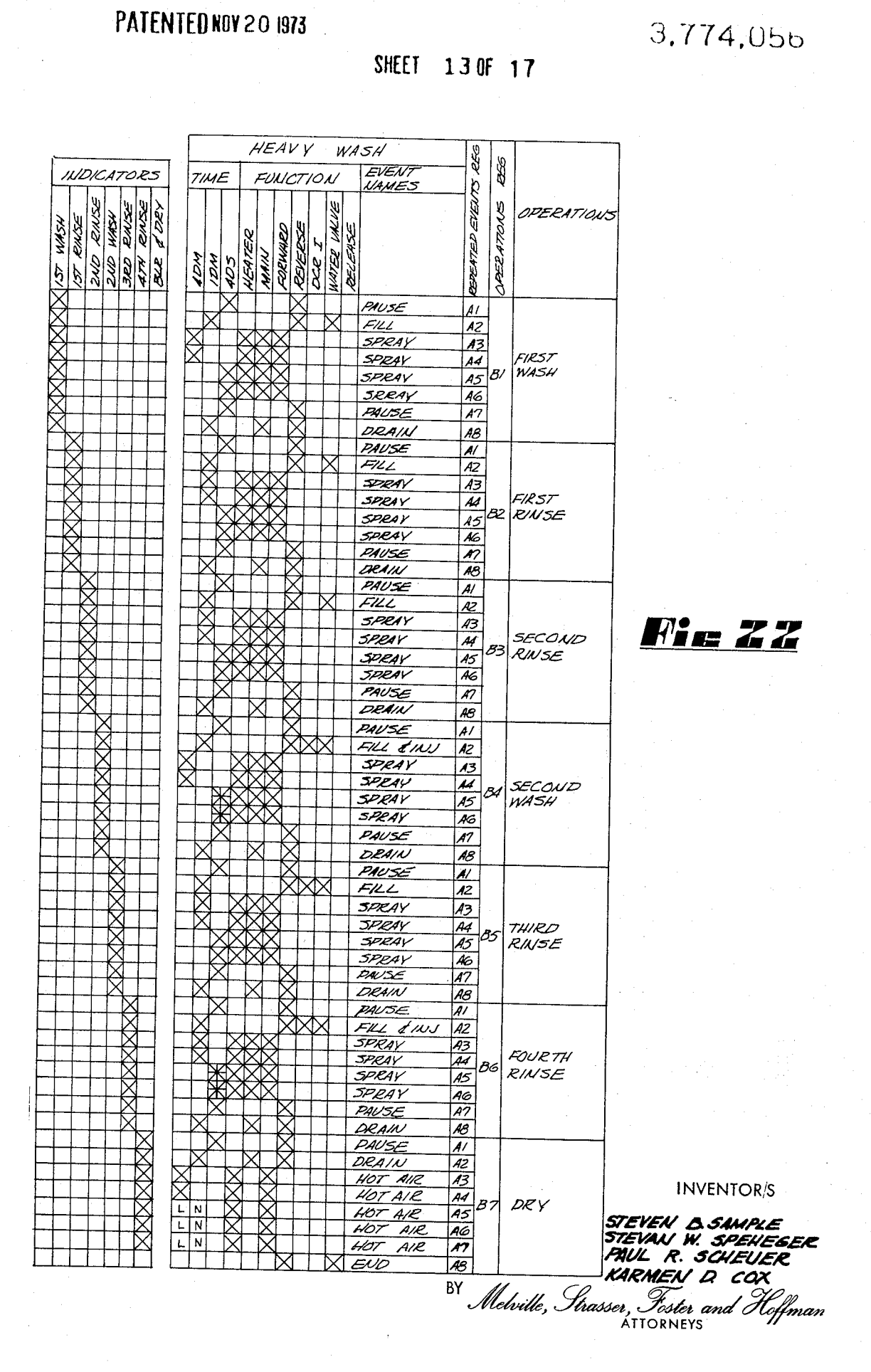
Figure 23:
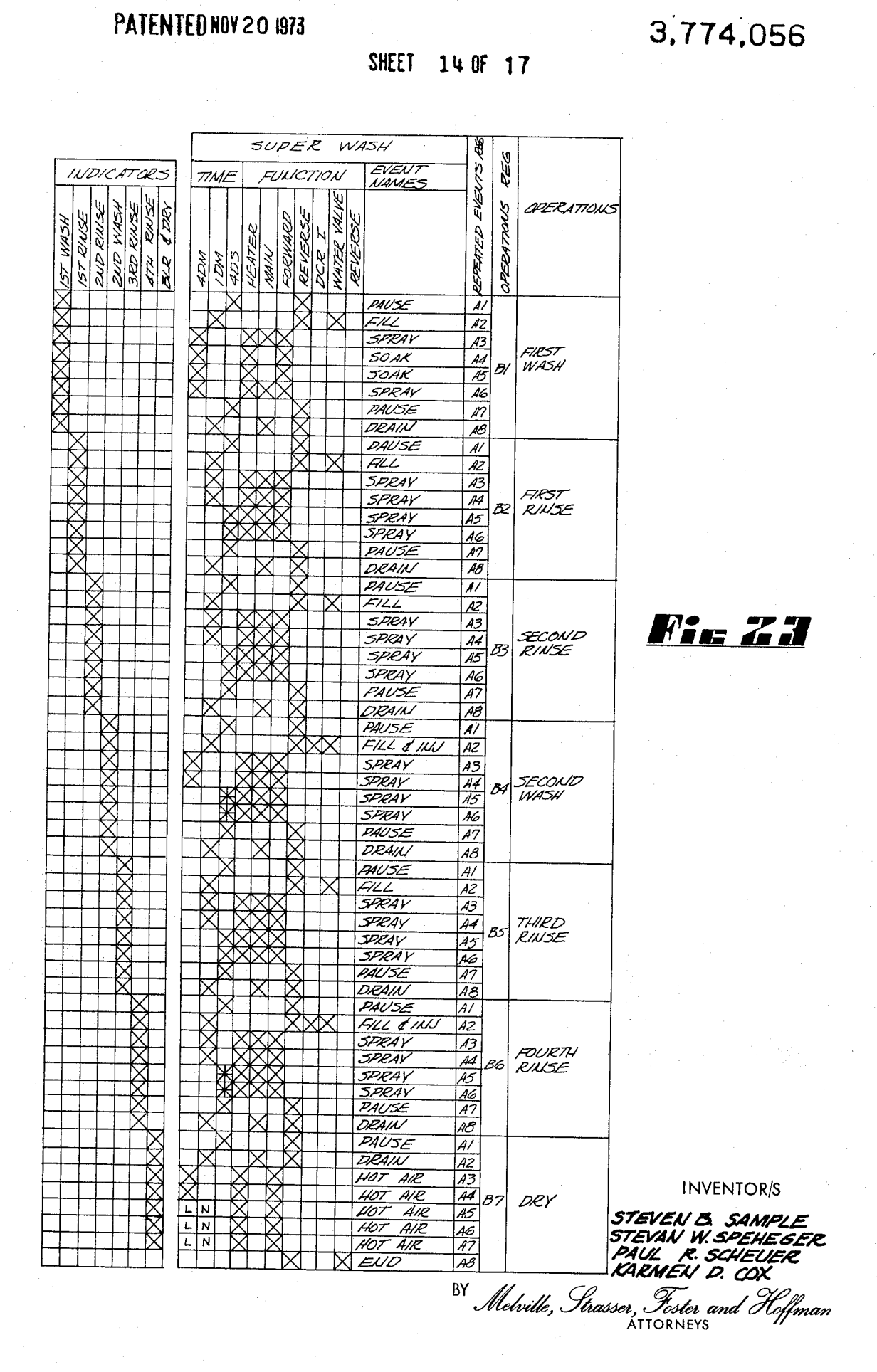
Figure 24:
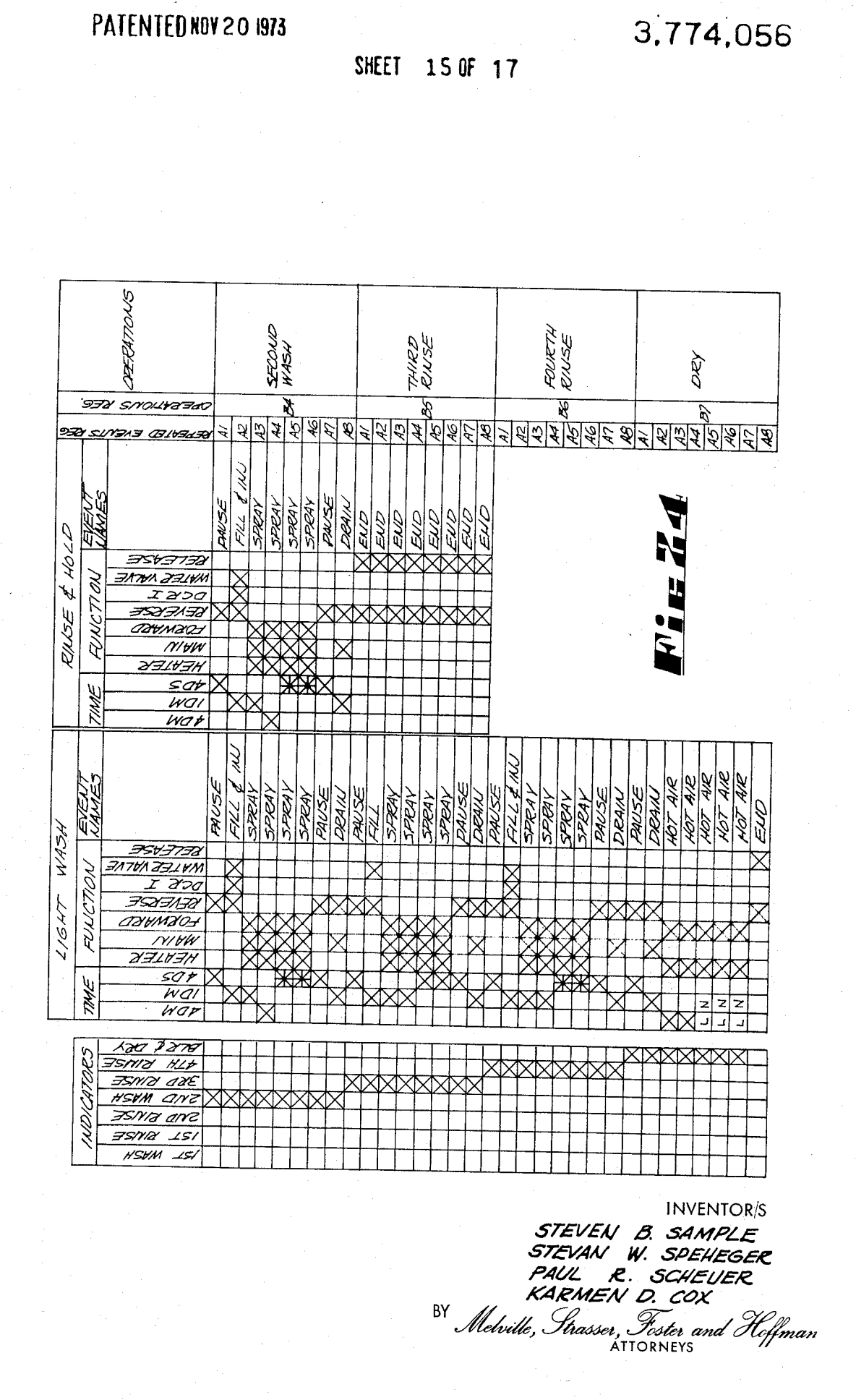

FIGS. 22 and 23 comprise the Truth Table for the Heavy Wash Cycle and the Super Wash Cycle, respectively. These Figures are set up in the same manner as FIG. 21, and are to be read in the same way. FIG. 24 is also arranged in the same manner as FIG. 21, and shows the Truth Table for the Light Wash and Rinse and Hold Cycles. It will be noted that the Light Wash Cycle extends through operations B 4 – B 7 while the Rinse and Hold Cycle extends through operations B 4 and B 5.

FIG. 25 is again set up in the same manner as FIG. 21 and illustrates the Truth Table for the Plate Warm, Cancel and Pumpout Cycles. It will be noted that the Plate Warm Cycle extends through the 8 events of the B 7 or dry operation. The Cancel Cycle extends through events A 1 – A 3 of the B 7 operation. Finally, the Pumpout Cycle (which will be more fully described hereinafter) extends through events A 1 and A 2 of the B 7 operation. The Pumpout Cycle is initiated by a signal from the water level sensor 13, and is not initiated by the operator.

As indicated above, all of the events take place for one of three possible time lengths. All of the time lengths are given in terms of digital time, since they are derived from the 60 Hz line. Thus, four digital seconds are the equivalent of 256 clock pulses or 4.266 actual seconds. One digital minute is the equivalent of 64 digital seconds or 4,096 clock pulses. Thus, one digital minute equals 1.14 actual minutes. Four digital minutes is equivalent to 256 digital seconds, or 16,384 clock pulses. Thus, four digital minutes is equal to 4.56 actual minutes.

The use of digital time, as opposed to actual time, has a number of advantages. Clearly, it is the easiest expedient to use a frequency divider in the control logic whose period is equal to an integral power of 2 times the clock period. Thus, the control logic is made much simpler. Finally, the difference between integral multiples of digital minutes and digital seconds, as opposed to integral multiples of actual minutes and actual seconds, does not make any real difference in an appliance such as a dishwashing machine or the like. The use of digital time has no effect on the accuracy and precision with which the appliance can operate.

While in most instances the one or more machine functions actuated during a given event are actuated throughout that event, there are some exceptions. For example, the forward and reverse motor windings do not stay on during an entire event, but rather are actuated in response to signals from a sensor circuit in the motor start circuit 13 (FIG. 15). In similar fashion, the water valve may not stay on during the entire length of every fill event, since it is responsive to the water level float switch sensor 13 (FIG. 15). In the various cycles of FIGS. 21 through 25, no time is shown for end events. This is true because at the beginning of an end event the clock is interrupted by the clock interrupt logic, and the end event persists until the master switch is released. Release of the master switch is normally substantially instantaneous. The logic is designed so that the only machine function that is energized during an end event is the release mechanism 226-227 of FIGS. 15 and 20. This reduces the required current rating of the master switch 214 of FIGS. 15 and 20.

In the Normal Wash, Light Wash, Heavy Wash, Super Wash and Plate Warm Cycles, the time lengths of the A 5, A 6 and A 7 events in the B 7 operation are variable through the use of the dry time select switch 225 (FIGS. 15 and 20). If the dry time select switch 225 is open, a normal dry time of one digital minute for each event will result. If the dry time select switch 225 is closed, a long dry time of 4 digital minutes for each event will result. This is generally indicated in the Truth Tables for these cycles by the use of the letters "L" for long dry time and "N" for normal dry time in the four digital minute and one digital minute columns, respectively, for events A 5 through A 7, in the B 7 operation.

Another exception occurs in the Light Wash, Rinse and Hold, Normal Wash, Heavy Wash and Super Wash Cycles. In these cycles the time lengths of events A 5 and A 6 in operations B 4 and B 6 are variable in response to temperature select switches 223 and 225 and temperature sensor 13a described with respect to FIGS. 15 and 20. For purpose of convenience, the time lengths of events A 5 and A 6 in the B 4 and B 6 operations are indicated by asterisks at four digital seconds. If both temperature select switches 223 and 224 are open, these events will all be four digital seconds long. However, if temperature select switch 223 is closed, so that the dishwasher will operate in the hot mode, the time specified for each of these events is four digital minutes, if the water temperature is less than 150°F (as determined by temperature sensor 13a) and four digital seconds, if the water temperature is greater than 150°F. Finally, if temperature select switch 224 is closed, so that the dishwasher operates in the 150°F mode, each of these events will extend for four digital seconds after the water has attained 150°F. In other words, this is the same as the normal temperature mode with an initial termostat delay until the water temperature has reached 150°F.

Figure 25:
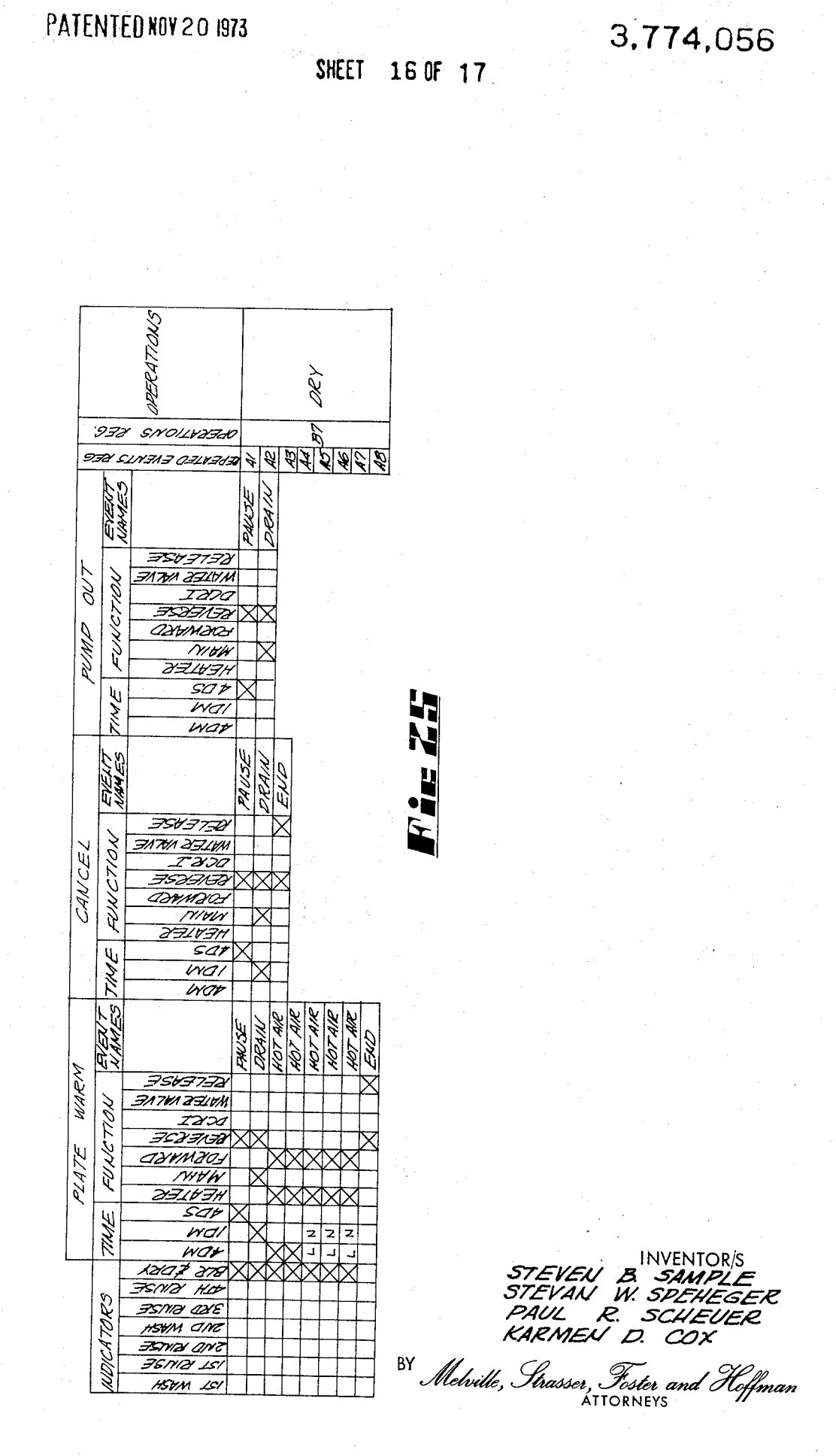

Finally, the Truth Table of FIG. 25, relating to the Pumpout Cycle, does not specify a time for the drain event (i.e., event A 2 of operation B 7). This is true because the drain event will continue until the logic is reset by the operator, as will be described hereinafter.

It will be noted that in the Truth Tables of FIGS. 21-25 the blower motor and dry indicator light are shown together in the INDICATORS column. This is true because the dry indicator light and blower motor are nonunique machine functions, as described above.

E. Control Logic

Returning now to FIG. 16, it has been previously noted that the control logic circuit of this Figure conforms to that of FIG. 2 above. Similarly, the embodiment of FIG. 16 closely resembles that of FIG. 4 in that the master counter 190-191 is divided into two parts, i.e., a frequency divider 190 and an events register 191. These elements are generally equivalent to the frequency divider 68 and events register 69 of FIG. 4.

As in the embodiment of FIG. 4, a period-control logic has been provided to vary the period of the frequency divider 190, using the divider-stage bypass principle discussed with respect to FIGS. 10 and 11. In addition, period-select logic is indicated at 232 to activate the appropriate part of the period-control logic. As in the embodiment of FIG. 4, the period-control logic 231 response to the outputs of the period-select logic 232.

As in the embodiment of FIG. 4, the period-select logic 232 of FIG. 16 selects the period of the frequency divider 190 for each event, based on the outputs of the decoding logic 192. In addition, however, the period-select logic 232 also responds to logical inputs from the cycle select switches 216 through 221 (FIG. 15), water temperature sensor 13a (FIG. 15), the overfill protection logic 233 of FIG. 16 (to be described hereinafter), the temperature mode selector switches 223 and 224 and the dry time selector switch 225 (FIGS. 15 and 20).

As in the embodiment of FIG. 4, the function control logic 193 of FIG. 16 controls the machine functions based on the outputs of the decoding logic 192, without the use of memory elements internal to the function control logic (i.e. no function control flip-flops as in the embodiment of FIG. 3). In addition, the function control logic 193 is responsive to other logical inputs such as inputs from the panel switches 12, from the water level sensor 13, from the motor start circuit 17 (FIG. 15), as well as from the overfill protection logic 233.

While the events register 191 is essentially equivalent to the events register 69 of FIG. 4, there is a fundamental difference between the decoding logic 192 and the decoding logic 62 of FIG. 4. As indicated above, the decoding logic 62 of FIG. 4 completely decodes the first EN states of the events register 69 so that there is exactly one output of the decoding logic 62 corresponding to each event in the complete cycle, and there can be only one decoding logic output that can be logical one at any given time.

In the embodiment of FIG. 16, however, the decoding logic 192 exploits the repetitious nature of the events within the first six operations. As can be readily seen from FIGS. 21, 22, and 23, the first six operations in the full length cycles (Normal Wash, Heavy Wash and Super Wash) generally consist of the same events, i.e., a pause event, a fill event, four spray events, a pause event and a drain event, in that order. The only exception is found in the first wash operation (B 1) of the Super Wash Cycle wherein the second two spray events are replaced by soak events.

It will therefore be clear to one skilled in the art that this constant repeating of the same eight events makes it possible to identify the first three stages 191a of the events register 191 as a "repeated events register"; with exactly one of the eight unique states of the repeated events register corresponding to exactly one of the eight repeated events. Similarly, the second three stages 191*b* of the events register 191 may be designated as an "operations register," with exactly one of the first seven states of the operations register corresponding to each of the operations B 1 through B 7 in the full length cycles.

In line with these designations, the decoding logic 192 decodes the eight states of the first three stages of the events register 191 (i.e., the repeated events register 191*a*) and the first seven states of the last three stages of the events register 191 (i.e., the operations register 191*b*) completely separately.

As will be clear to one skilled in the art this decoding method or technique will result in a significant savings in logic over that described with respect to the embodiment of FIG. 4. Another feature resides in the fact that there are exactly eight repeated events. This is fortuitous by design because in this way the repeated events register 191*a* will automatically increase the count of the operations register 191*b* by one, each time the repeated events register 191*a* advances through the complete sequence of its eight repeated events. Thus, for every eight changes of state of the repeated events register 191*a*, the operations register 191*b* will automatically make one change of state. As a result, there are exactly two outputs of the decoding logic 192 which will be logical one for any given time. One of these will be one of the eight outputs corresponding to the eight decoding gates (generally indicated at 192*a*) for the repeated events register 191*a*. The other one will be one of the seven outputs corresponding to the seven decoding gates (generally indicated as 192*b*) for the operations register 191*b*. In FIG. 16, the eight decoding gates 192*a* for the repeated events register 191*a* are designated A 1 through A 8, corresponding to the event designations in the Truth Tables of FIG. 21 through 25. Similarly, the seven decoding gates 192*b* for the operations register 191*b* are designated B 1 through B 7, again corresponding to the designation of the operations on the Truth Tables of FIGS. 21 through 25.

The fact that in most operations there are four spray events permits the achievement of a wide variety of total spray time in the several operations of the several cycles, while using only three frequency divider periods (i.e., four digital minutes, one digital minute and four digital seconds). The consideration applies in achieving different total dry time via the multiplicity of hot air events in the dry operation.

The embodiment of FIG. 16 provides appropriate logic for implementing the clock-interrupt feature. The clock-interrupt logic comprises an OR gate indicated at 234 and clock-interrupt select logic, indicated at 235. The output of OR gate 234 is connected to the reset input of the tenth stage of the frequency divider 190. Thus the clock-interrupt logic differs from that described with respect to FIG. 5 in that it holds the output of the tenth stage of frequency divider 190 at logical zero, thereby inhibiting any change in state of any succeeding stages of the frequency divider or any stages in the events register 191. As will be evident to one skilled in the art, this allows the use of the first nine stages of the frequency divider for counting clock periods, even when the progress of the events register is being delayed. For example, a desired number of the first nine stages of the frequency divider may be used to blink the first wash light during the Pumpout Cycle, as will be described hereinafter. The clock-interrupt is responsive to signals from the decoding logic 192 and the function-control logic 193. It is also responsive to the temperature select switches 223 and 224 (FIGS. 15 and 20) and the temperature sensor 13*a* (FIG. 15).

The embodiment of FIG. 16 also has a plurality of preset gates 236. The preset gates set the operations register 191*b* to certain predetermined states as required by the various cycles. The preset gates 236 are similar to those shown at 101 in FIG. 6. The inputs of these gates are derived from the outputs of the state-select logic 237.

The state-select logic 237 is the equivalent of the state-select logic illustrated at 110 in FIG. 6. The state-select logic determines the initial state to which the operations register 191*b* will be preset at the beginning of each cycle. For this purpose, the state-select logic 237 derives a signal from one of the cycle select switches. The state-select logic may also be actuated by signals from the overfill protection logic 233 or the reset-control logic 238.

The reset-control logic 238 is similar to that described above and controls the resetting of the several stages of the frequency divider 190 and the repeated events register 191*a*. It also generates a signal which enables the presetting of the operations register 191*b* by means of the state-select logic 237 and the preset logic 236, as indicated above. The inputs to the reset-control logic come from the start-pulse generator (FIG. 19) and the overfill protection logic 233 (FIG. 16).

F. Overfill Protection Logic

As mentioned above, the embodiment of FIGS. 15 and 16 is provided with an overfill protection logic, indicated at 233 in FIG. 16. The circuit 233 is more clearly shown in FIG. 26.

The overfill protection logic 233, in conjunction with the water level sensor 13 (FIG. 15) has a twofold purpose. First, it is intended to turn off the water valve 198 (FIG. 15) if the water pressure is sufficiently high to fill the vat of the dishwasher with the required amount of water before the full fill time has elasped. Secondly, if water continues to enter the vat at any part of a cycle after a fill event is completed, the overfill protection logic locks the control logic circuit 9 (FIG. 15) into the Pumpout Cycle.

Figure 26:
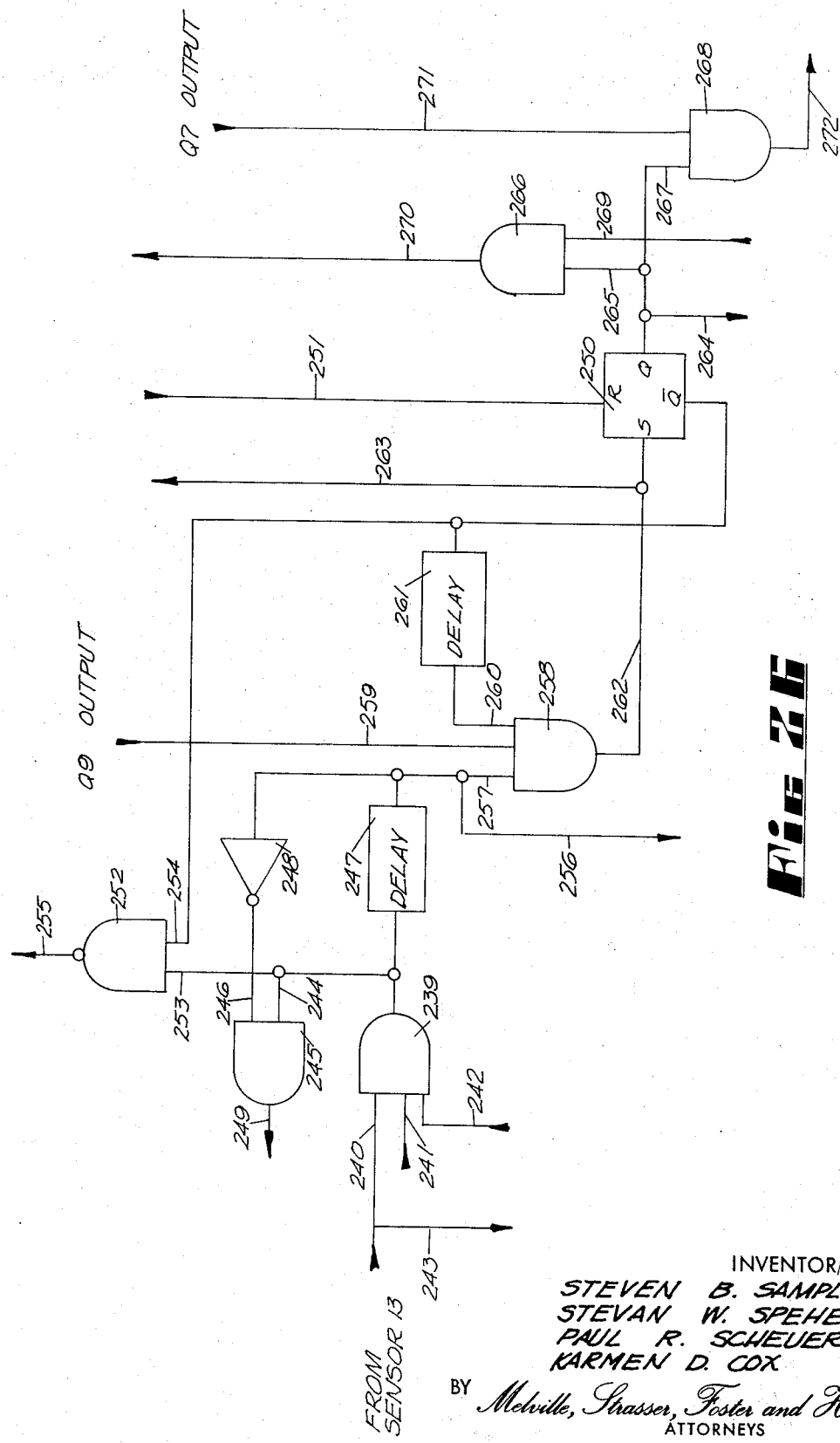
FIG. 26 is a logic diagram illustrating the overfill protection logic of the embodiment of FIGS. 15 and 16.

It is to be noted that in the embodiment of FIGS. 15 and 16 the overfill protection can be accomplished through the use of a single sensor 13. The water level sensor 13 may be of the nature of a float switch, or the like, well known in the art. In FIG. 26, an AND gate 239 is shown, having inputs 240, 241 and 242. The input 240 is connected to the output of the water level sensor 13. The input 241 is connected to the output of the function control logic controlling the heater 197 (FIG. 15). Finally, the input 242 is connected to that part of the function control logic that turns off the pump motor 194 (FIG. 15) during the soak events.

If an overfill condition exists at any time, the input 240 will have a logical one signal by virtue of the float switch or sensor 13. This logical one signal will also go to the water valve circuit via lead 243 to cause the water valve to close. If no additional water enters the vat, the logical one output of the water level sensor 13 will disappear during a subsequent spray event (when the water level will lower somewhat) and the Pumpout Cycle will not be initiated. Under any circumstances, the Pumpout Cycle will not begin during a pause or drain event, since logical zero will appear at leads 241 and 242. During the drain events, the appliance is already draining. The effect is negligible during the pause events, because a pause event lasts only four digital seconds.

If water continues to enter the vat despite the fact that an overfill signal from the float switch 13 has sent a logical one signal to that part of the function control logic which turns off the water valve, the overfill protection logic will come into play during a spray or hot air event. Thus, if water continues to enter the vat because of a mechanical failure of the water valve solenoid, a failure of the control logic, a failure of the interfacing devices, or the like, the critical level will eventually be reached during one of the spray or hot air events, whereupon the overfill protection logic will cause the control logic to enter the Pumpout Cycle in the following manner.

During a spray or hot air event, leads 241 and 242 will be logical one. Should the float switch also send a logical one signal via lead 240, the output of AND gate 239 will be logical one. This will provide a logical one at the input 244 of AND gate 245. The other input 246 of AND gate 245 is connected to the output of AND gate 239 through a delay circuit 247 and an inverter 248. Initially, the input 246 is logical one by virtue of the inverter 246, until the delay time of delay circuit 247 has been reached, whereupon the signal to input 246 will become logical zero. Thus, AND gate 245, inverter 248 and delay circuit 247 constitute a pulse generator. The pulse generated at the output 249 of AND gate 245 is connected to the reset control logic to reset the first nine stages of the frequency divider 190 to logical zero.

A flip-flop is indicated at 250. The reset input of flip-flop 250 is connected to the start pulse generator by lead 251. By virtue of this, it will be understood that the Q output of flip-flop 250 will normally be logical zero. Therefore, the $\bar{Q}$ output of the flip-flop will normally be logical one.

A NAND gate 252 has one input 253 connected to the output of AND gate 239 and its other input 254 connected to the $\bar{Q}$ output of flip-flop 250. Under the normal conditions described above, when the overfill protection logic is not actuated, the input 253 will normally be logical zero and the input 254 will normally be logical one, so that the output 255 of NAND gate 252 will normally be logical one. When the output of AND gate 239 becomes logical one, the output of NAND gate 252 will become logical zero and this logical zero signal is connected to the periodselect logic and inhibits its selection of the one digital minute and four digital second counter stage bypass circuits.

It will be noted that the output of the delay circuit 247 is connected to a lead 256 and an input 257 of an AND gate 258. When the output of the delay circuit 247 is logical one, this signal will go via lead 256 to the state-select logic 237 (FIG. 16) to enable the state-select logic 237 to preset the operations register 191b to the B 7 operation when the preset logic 236 receives a signal from the reset-control logic 238. At the same time, a logical one will appear at input 257 of AND gate 258.

Input 259 of AND gate 258 is connected to the ninth stage of the frequency divider 190. The first nine stages of the frequency divider having been reset to zero by the output 249 of AND gate 245, the input 259 of AND gate 258 will initially be logical zero. The third input 260 of AND gate 258 is connected through delay circuit 261 to the Q output of flip-flop 250. Thus, input 260 will be a logical one.

The signal at the input 259 is initially logical zero. Since the first nine stages of the frequency divider were reset by the pulse from 245, the output 262 of AND gate 258 will initially be logical zero, as well.

The first nine stages of the frequency divider having been reset to zero, a logic one will appear at the Q output of the ninth stage only after the passage of four digital seconds. Thus, four digital seconds after actuation of the AND gate 239 input 259 of AND gate 258 will become logical one and, inputs 257, 259 and 260 all being logical one, the output 262 of AND gate 258 will become logical one. The output 262 of AND gate 258 is connected to the set input of flip-flop 250. It is also connected, via lead 263, to the reset-control logic 238 (FIG. 16). The output of AND gate 258 will cause the Q output of flip-flop 250 to become logical one and the $\bar{Q}$ output to become logical zero. This will terminate the logical zero output at 255 of NAND gate 252. At the same time, the logical one output of AND gate 258 will be sent to the reset-control logic via lead 263, setting the control logic to event A 1 of operation B 7. The logical one at the output of AND gate 258 will go to logical zero some time after the $\bar{Q}$ output of flip-flop 250 goes to logical zero due to the delay circuit 261.

The logical one at the Q output of flip-flop 250 will be sent via lead 264 to the function control logic to disable the dry indicator light which would normally be on during the A 1 event of the B 7 operation. The same logical one Q signal from flip-flop 250 will appear at input 265 of AND gate 266 and at input 267 of AND gate 268.

The other input 269 of AND gate 266 is connected to the second repeated events output of the decoding logic 192 (i.e., the A 2 output). When this output becomes logical one, the input 269 will become logical one and the output 270 of AND gate 266 will become logical one. The output 270 is connected to the clock interrupt 234 (FIG. 16) and interrupts further progress of the last five stages of the frequency divider 190 and all of the stages of the events register 191.

The input 271 of AND gate 268 is connected to the Q output of the seventh stage of the frequency divider 190. The output 272 of AND gate 268 is connected to that part of the function control logic which controls the first wash light.

During the A 2 event of the B 7 operation, the first two stages of the frequency divider 190 are bypassed, so that the signal to input 271 effectively come from the equivalent of a five-stage frequency divider. Thus, the input 271 will have an alternate signal of logical one and logical zero, the period of the seventh stage now being one-half digital second. Thus, the output at 272 will cause the first wash light to blink, being on for one-quarter digital second and off for one-quarter digital second.

From the above description it will be evident that when the proper conditions are met to bring the overfill protection logic into play, the logical one signal from delay circuit 247 will cause the stearing logic to be set up to perform operation B 7 upon the appearance of a start pulse. The output of AND gate 239 and the $\bar{Q}$ output of flip-flop 250 will, via NAND gate 252 inhibit the four digital second and one digital minute bypass circuits. Further, the output of AND gate 245 will reset the first nine stages of the frequency divider 190 to zero.

After the passage of four digital seconds (i.e., the time it takes for a logical one to appear at the Q output of the ninth stage), the output of flip-flop 250 will become logical one and the dishwasher will be locked into the Pumpout Cycle. This is true because the output of AND gate 258 (the same output which caused flip-flop 250 to have an output of logical one) causes a preset pulse to be generated which results in the control logic being preset to B 7.

As will be seen from FIG. 25, the first event of operation B 7 (under the Pumpout Cycle) is a four digital second pause. The second event is a drain event. The initiation of the A 2 decoding gate of the decoding logic 192 will simultaneously cause the further progress of the last five stages of the frequency divider and the stages of the events register to stop, insuring that the appliance will continue to drain indefinitely. Similarly, the first wash light will flash indefinitely. The only way the the Q output of flip-flop 250 can be reset to zero is by pushing the Cancel button 229. This will cause a signal from the start-pulse generator to reset flip-flop 250.

The four digital second delay initiated by resetting the first nine stages of the frequency divider 190 to zero will assure that a logical one signal from the water level sensor 13 must persist for four full digital seconds during a spray, soak or hot air event, before the overfill protection logic is locked into the Pumpout Cycle. This four digital second delay avoids the possibility of inadvertently locking the overfill protection logic due merely to random momentary closure of the water level sensor contacts, caused by sloshing of the water in the vat during the spray events.

G. Operation of the Complete Embodiment

The various elements of the embodiment of FIGS. 15 and 16 having been discussed, the operation of this embodiment will be described as follows. At the outset, the operator loads the tableware to be washed into the racks of the dishwashing machine and closes the vat door. Closure of the vat door will close the door safety switch 7. Next, the operator selects any desired cycle by depressing any one of cycle selector push buttons 216a through 220a and 228. The operator has the option of selecting one of the three temperature modes and one of the two dry times at this point or any other time while the cycle is in progress.

Depression of any one of the cycle select push buttons will close and latch switch 214 of the master switch 6. Closure of the master switch will provide power to the DC power supply 17. The DC power supply will provide two voltages, a high voltage V 1 and a low voltage V 2. As described above, the low voltage V 2 is automatically delayed with respect to the high voltage V 1.

The inverter 212 (FIG. 16) of the start pulse generator is powered by V 1, while its input receives V 2. Thus, the output of the start pulse generator inverter 212 will be logical one (i.e. the start pulse) whenever V 1 is at its rated value and V 2 is below the level required to cause the output of inverter 212 to be logical zero. As a consequence, the start pulse generator will generate a pulse whenever the master switch is first closed by any one of the cycle-select push buttons (other than the cancel push button).

The reset control logic 238, the frequency divider 190, the events register 191, the preset gates 236, flip-flop 250 in the overfill protection logic 233, the state-select logic 237 and the cycle select inputs from the cycle select push buttons are all powered by voltage V 1. As a consequence, the pulse generated by the start pulse generator, when the master switch is first closed, will reset the frequency divider 190, the repeated events register 191a, and the flip-flop 250 of the overfill protection logic. The start pulse will also preset the operations register 191b to the proper initial state for the cycle selected. Upon termination of the start pulse, the cycle will begin and, if not interrupted, will proceed to the end whereupon the release mechanism 226 - 227 will release the switch 214 of the master switch 6 and all power will be disconnected from the appliance.

The same sequence of events will be repeated if, for any reason, the line power to the appliance should fail during a cycle and then come on again. Thus a line power failure in the middle of a cycle and subsequent resumption causes the appliance to start the selected cycle over again, thereby preventing the logic from entering some random state when power is resumed, which might result in some undesirable or even damaging functioning of the machine.

Once a cycle has been started, the depression of any other cycle select push button (except the Cancel Cycle push button) will not cause a start pulse to be generated. This is true because the master switch 6 is already closed and both voltage V 1 and voltage V 2 are already at their operating levels. Therefore, once a cycle has been started, the depression of any other cycle select push button (except the Cancel Cycle push button) will result in a lateral shift in the Truth Table from the column representing the initial cycle, to the column representing the new cycle (i.e, without any change in state in the frequency divider 190 or the events register 191). This horizontal shift will cause the logic to remain in the corresponding event of the same operation of the new cycle. If the new cycle has no such corresponding event and operation defined for it, the logic will perform the corresponding events and operations of the Normal Wash Cycle, until a corresponding operation and event is reached which is defined for the new cycle. Thereafter, the logic will perform the new cycle to its end. If no such corresponding operation and event exists, the Normal Wash Cycle will be completed.

As a result of the above, the control system of the present invention is relatively temper-proof, in that it prevents the logic from rapidly jumping from one state to another.

If it is desired, for one reason or another, to simply stop a cycle which is in progress or to stop such a cycle and begin a different one, the operator must depress the cancel push button 229. As indicated above, over-travel of the cancel push button will momentarily open normally closed switch 222, disconnecting the V 2 power supply to the logic chip. This causes the output of the start-pulse generator to be logical one and thereby causes the events register 191 to be instantly preset to event A 1, operation B 7, which is the proper initial state for the Cancel Cycle (see FIG. 25).

Thus, the cancel push button 229 is the only panel switch available to the operator which will effect a change in the state of the events register 191, once the master switch has been closed. Depression of the cancel push button will cause the previously selected cycle to be cancelled, the vat of the appliance to be drained of all fluids and the appliance to be turned off. Thereafter, if desired, a different cycle select push button may be depressed.

Modifications may be made in the invention without departing from the spirit of it. As indicated above, the various embodiments of the present invention have been set forth in exemplary fashion in terms of AND gates, OR gates, NAND gates, NOR gates, inverters, and the like. It will be understood by one skilled in the art that many of the components of the present invention may be represented by various combinations of logic elements, and the particular logic elements shown are not intended to be limiting.

The embodiments of the invention in which an exclusive property or privilege is claimed are defined as follows:

1. An electronic digital control system for automatic appliances and the like of the type having a plurality of on-off machine functions to be activated and deactivated in accordance with a control strategy comprising one or more cycles made up of a plurality of events, said control system comprising a source of continuous, equally spaced electrical pulses and a control logic, said control logic comprising a master counter and a strategy logic, said master counter having a plurality of stages, said stages having outputs, said strategy logic comprising a decoding logic to select and decode those states of the master counter relevant to said control strategy and a function control logic to interpret said selected states of said master counter and to control said machine functions in accordance with said control strategy, said decoding logic and said function control logic both having inputs and outputs, said pulse source being connected to said master counter, said inputs of said decoding logic being connected to some at least of said stage outputs, some at least of said outputs of said decoding logic being connected to some at least of said inputs of said function control logic, some at least of said outputs of said function control logic being connected to said machine functions, whereby said master counter is caused to change its state by pulses from said pulse source and said machine functions are activated and deactivated by said function control logic in response to said states of said master counter as selected and decoded by said decoding logic in accordance with said control strategy.

2. The structure claimed in claim 1 wherein said control logic includes protection logic and wherein a sensing means for sensing appliance condition is connected to said protection logic, said protection logic being operative to preset said master counter to a predetermined state after a predetermined length of time has elapsed upon receipt of a signal from said sensing means and said protection logic being further operative to maintain said counter in a subsequent predetermined state after said preset operation has been effected.

3. The structure claimed in claim 1 including preset means coupled to said master counter by which any predetermined number of said stages of said master counter may be made to instantly selectively assume logical one or logical zero.

4. The structure claimed in claim 3 wherein said preset means is further connected to outputs of some at least of said master counter stages to be preset whereby said preset means is activated by signals derived from said last mentioned master counter stages, delaying means connected between said stage outputs and said preset means whereby said master counter stages to be preset are properly preset before said actuating signal disappears.

5. The structure claimed in claim 1 wherein said appliance comprises a dishwashing machine.

6. The structure claimed in claim 1 including means responsive to a signal from a source external of said means and interposed between said pulse source and said master counter to interrupt the transmission of pulses from said pulse source to said master counter for the duration of said signal, thereby inhibiting any change in state of said master counter for the duration of said signal.

7. The structure claimed in claim 1 including reset means connected to said master counter by which any predetermined number of said stages of said master counter may be instantly reset to logical zero.

8. The structure claimed in claim 7 wherein said reset means is further connected to outputs of some at least of said master counter stages to be reset whereby said reset means is actuated by signals derived from said last mentioned master counter stages, delaying means connected between said stage outputs and said reset means whereby said master counter stages to be reset are properly reset before said actuating signal disappears.

9. The structure claimed in claim 1 including means connected to said master counter for bypassing at least one of said stages of said master counter.

10. The structure claimed in claim 1 including a source of power for said control logic, said source of power for said control logic comprising a non-inductive DC power supply.

11. The structure claimed in claim 10 wherein said DC power supply comprises a power supply providing a first voltage and a second voltage.

12. The structure claimed in claim 11 including means within said DC power supply for delaying the establishment of said second voltage with respect to the establishment of said first voltage.

13. The structure claimed in claim 11 wherein said DC power supply comprises a diode, a first resistor and a capacitor in series connection with a source of line voltage, a second resistor and a first zener diode connected together in series, said series connected second resistor and first zener diode being connected across said capacitor, a third resistor and a second zener diode connected in series, said series connected third resistor and second zener diode being connected across said capacitor, the voltage across said capacitor minus the voltage across said second resistor being greater than the break-over voltage of said first zener diode, said voltage across said capacitor minus said voltage across said third resistor being greater than the break-over voltage of said second zener diode, the voltage across said first zener diode comprising said first voltage, the voltage across said second zener diode comprising said second voltage.

14. The structure claimed in claim 13 wherein said first voltage is higher than said second voltage and including means for delaying the establishment of said second voltage with respect to the establishment of said first voltage, said means comprising a second capacitor connected in parallel with said second zener diode, said second voltage comprising the voltage across said second capacitor, whereby said second voltage will be delayed with respect to said first voltage by the amount of time required to charge said second capacitor.

15. The structure claimed in claim 13 wherein said first voltage is higher than said second voltage and including means to delay said second voltage with respect to said first voltage, said means comprising a fourth zener diode so connected in series with said third resistor and said third zener diode that said second voltage will appear across said third zener diode after the break-over level of said fourth zener diode has been reached, said fourth zener diode being chosen to have a break-over level equal to said first voltage.

16. The structure claimed in claim 1 including a source of line voltage, said pulse source comprising a circuit to attenuate and rectify said line voltage.

17. The control system of claim 1 including a source of AC line current, said pulse source comprising circuit means to attenuate and rectify said line current, a master switch, said pulse source being connected to said source of line current through said master switch, interfacing means in said connections between some at least of said machine functions and the outputs of said strategy logic, said source of line current comprising a source of power for said some at least of said machine functions via said master switch and said interfacing means, a DC power supply connected to said source of line current through said master switch, said DC power supply comprising a source of power for said control logic.

18. The structure claimed in claim 17 including a safety switch in said connections between said master switch and said pulse source and between said master switch and said machine functions.

19. The structure claimed in claim 1 including a source of power for said control logic comprising a DC power source, at least one of said machine functions comprising a high current machine function, a source of AC voltage comprising a power source for said high current machine function, interfacing means connected between said high current machine function and its respective function control logic output, said interfacing means comprising a high current bidirectional thyristor and a lower current sensitive-gate bidirectional thyristor, said high current machine function being connected to said AC source via said high current bidirectional thyristor, the gate of said high current thyristor being connected to the load terminal of said low current thyristor, the gate of said low current thyristor being connected to said last mentioned function control logic output.

20. The structure claimed in claim 19 wherein said control logic is implemented in the form of an MOS integrated circuit, said low current thyristor being controlled directly by said MOS integrated circuit.

21. The structure claimed in claim 1 including preset means connected to said master counter by which any desired number of stages of said master counter may be made to instantly selectively assume logical one or logical zero, reset means connected to said master counter by which any desired number of said stages of said master counter may be instantly reset to logical zero, a source of line current, a DC power supply connected to said line current, a master switch in said connection between said line current source and said DC power supply, a plurality of non-corrective cycle select pushbuttons by which selectable ones of said cycles of said control strategy may be chosen for performance by said appliance, said non-corrective cycle select pushbuttons having outputs connected to said control logic, said DC power supply comprising the power source for said control logic and said non-corrective cycle select pushbutton outputs, a start-pulse generator connected to said DC power supply, the output of said start-pulse generator being connected to said control logic to activate said preset and reset means in accordance with the output of any selected one of said non-corrective cycle select pushbuttons upon closure of said master switch, means connected to said start-pulse generator for maintaining said start-pulse until said DC power supply has reached its minimum acceptable output for operation of said control logic, and means connected to said master switch for automatically opening said master switch upon completion of a cycle.

22. The structure claimed in claim 21 wherein said start-pulse generator comprises a delay circuit and an inverter, the input of said delay circuit being connected to said DC power supply, the output of said delay circuit being connected to the input of said inverter, the output of said inverter comprising said start-pulse, said delay circuit being chosen to have a delay time sufficient to assure that said DC power supply has reached said minimum acceptable output.

23. The structure claimed in claim 21 wherein said DC power supply provides a first and a second voltage, means in said DC power supply for delaying the establishment of said second voltage with respect to the establishment of said first voltage, said first voltage comprising the power for a part at least of said control logic and the outputs of said cycle select pushbuttons, said second voltage comprising the power for the remainder of said control logic, said start-pulse generator comprising an inverter the input of which is connected to said second voltage, the output of said inverter comprising said start-pulse, said delay means in said DC power supply comprising said means for maintaining said start-pulse until said first voltage of said DC power supply has reached said minimum acceptable output.

24. The structure claimed in claim 21 wherein said non-corrective cycle select pushbuttons are mutually exclusive, and means whereby depression of any one of said cycle select pushbuttons results in closure of said master switch.

25. The structure claimed in claim 24 including a cancel cycle pushbutton, said cancel cycle pushbutton being mutually exclusive with said non-corrective cycle select pushbuttons, a normally closed switch between said DC power supply and said start-pulse generator, said cancel cycle pushbutton being operatively connected to said normally closed switch to momentarily open said normally closed switch upon depression of said cancel cycle pushbutton, whereby to initiate a start-pulse upon depression of said cancel cycle pushbutton while said master switch is closed.

26. The structure claimed in claim 1 wherein said master counter is separated into a frequency divider and an event control counter, the output of said frequency divider being connected to the input of said event control counter such that said event control counter advances its state by one each time said output of said frequency divider exhibits a logical one-zero transition, said frequency divider having a period such that the duration of every one of said events of said control strategy is an integral multiple of said period, the total number of said states of said event control counter being at least equal to the maximum number of said periods comprising the duration of any of said cycles of said control strategy, said decoding logic having a separate output corresponding to each separate event of said control strategy such that any given output of said decoding logic exhibits a logical zero-one transition only at the beginning of its corresponding event, said function-control logic comprising a function-control flip-flop for each machine function and means for setting and resetting each of said flip-flops, the output of each of said function-control flip-flops being connected to its respective machine function, the inputs of said setting and resetting means being connected to appropriate ones of the outputs of said decoding logic, whereby said machine functions will be activated and deactivated at the proper times and in the proper sequence in accordance with said control strategy.

27. The structure claimed in claim 26 including reset means by which a predetermined number of said stages of said frequency divider can be immediately reset to logical zero, said reset means being connected to outputs of some at least of said stages of said frequency divider whereby said reset means generates a reset signal in response to signals from said last mentioned stages of said frequency divider to shorten the period of said frequency divider, delay means responsive to said reset signal for properly resetting said frequency divider stages before said actuating signal disappears.

28. The structure claimed in claim 26 including means for varying the period of said frequency divider, said means comprising means for bypassing at least one of said stages of said frequency divider.

29. The structure claimed in claim 28 wherein said means for bypassing said at least one of said stages of said frequency divider is activated in part at least by the state of at least one of the succeeding stages of said frequency divider.

30. The structure claimed in claim 26 including preset means coupled to said master counter by which any predetermined number of said stages of said master counter may be made to instantly selectively assume logical one or logical zero.

31. The structure claimed in claim 30 wherein said preset means is connected to outputs of some at least of said master counter stages to be preset whereby said preset means is activated by signals derived from said last mentioned counter stages, delaying means between said stage outputs and said preset means whereby said master counter stages to be preset are properly preset before said actuating signal disappears.

32. The apparatus claimed in claim 26 wherein said appliance comprises a dishwashing machine.

33. The structure claimed in claim 26 including means responsive to a signal from a source external of said means and interposed between said pulse source and said master counter to interrupt the transmission of pulses from said pulse source to said master counter for the duration of said signal, thereby inhibiting any change in state of said master counter for the duration of said signal.

34. The structure claimed in claim 26 including means responsive to a signal from a source external of said means and interposed between said pulse source and said master counter to interrupt the transmission of pulses from one stage of said master counter to the next stage of said master counter for the duration of said signal, thereby inhibiting any change in state of said next stage and any succeeding stages of said master counter for the duration of said signal.

35. The structure claimed in claim 26 including reset means coupled to said master counter by which any predetermined number of said stages of said master counter may be instantly selectively reset to logical zero.

36. The structure claimed in claim 35 wherein said reset means is connected to outputs of some at least of said master counter stages to be reset whereby said reset means is actuated by signals derived from said last mentioned master counter stages, delaying means connected between said stage outputs and said reset means whereby said master counter stages to be reset are properly reset before said actuating signal disappears.

37. The structure claimed in claim 26 including interfacing means between said strategy logic and said machine functions.

38. The structure claimed in claim 26 wherein said control logic is implemented in the form of an MOS integrated circuit.

39. The structure claimed in claim 38 including interfacing means between said MOS integrated circuit and said machine functions.

40. The structure claimed in claim 39 wherein some at least of said interfacing means comprise bidirectional thyristors which are triggered into conduction directly from said MOS integrated circuit.

41. The structure claimed in claim 26 including means for bypassing at least one of said stages of said master counter.

42. The structure claimed in claim 41 wherein said means for bypassing at least one of said stages of said master counter depends in part at least for its activation on the state of at least one of the succeeding stages in said master counter.

43. The structure claimed in claim 1 wherein said master counter is separated into a frequency divider and an events register, the output of said frequency divider being connected to the input of said events register such that said events register advances its state by one each time said output of said frequency divider exhibits a logical one-zero transition, said frequency divider having a period at least equal to the duration of the longest event of said control strategy, said events register having a number of unique states at least equal to the maximum number of events in any of said cycles of said control strategy, said decoding logic having a separate output corresponding to each separate event of said control strategy such that a logical one appears at a given output of said decoding logic only during the state of said events register corresponding to that output of said decoding logic, period control logic for shortening the period of said frequency divider, said period control logic having inputs and outputs, period select logic for selecting the desired period for said frequency divider, said period select logic having inputs and outputs, said stages of said frequency divider having reset inputs, said outputs of said period control logic being connected to selected reset inputs of said frequency divider stages, outputs of said period select logic being connected to inputs of said period control logic, some at least of said outputs of said decoding logic being connected to said inputs of said period select logic such that for each state of said events register the period of said frequency divider is of the proper duration for the event corresponding to that state.

44. The structure claimed in claim 43 wherein said function-control logic comprises a plurality of multiple-input function-control gates, said function-control gates being equal in number to said machine functions, the output of each of said function-control gates being connected to its respective machine function, some at least of said outputs of said decoding logic being connected to said inputs of said function-control gates such that the proper machine functions are activated during the event corresponding to each output of said decoding logic.

45. The structure claimed in claim 43 wherein said control strategy comprises one or more cycles made up of a plurality of sequential operations, the preponderance of said operations comprising the same series of repeated events, said events register being separated into a first group of stages comprising a repeated events register and a second group of stages comprising an operations register, said repeated events register having exactly one state for each of said repeated events, said operations register having a unique state for each operation in the longest one of said cycles capable of being performed by said appliance, the output of said repeated events register being connected to the input of said operations register such that said operations register advances its state by one each time said repeated events register advances through the complete series of its states, said decoding logic being separated into first and second parts, said first part having a separate output for each state of said repeated events register, said second part having a separate output for each state of said operations register corresponding to an operation of said control strategy, the inputs of said first and second parts of said decoding logic being so connected to the outputs of said stages of said repeated events register and said operations register respectively that at any given time there will simultaneously be a logical one at exactly one of said outputs of said first part and exactly one of said outputs of said second part of said decoding logic.

46. The structure claimed in claim 45 including preset means coupled to said master counter by which a predetermined number of said stages of said master counter may be made to instantly selectively assume logical one or logical zero.

47. The structure claimed in claim 45 wherein said appliance comprises a dishwashing machine.

48. The structure claimed in claim 45 including means responsive to a signal from a source external of said means and interposed between said pulse source and said master counter to interrupt the transmission of pulses from said pulse source to said master counter for the duration of said signal, thereby inhibiting any change in state of said master counter for the duration of said signal.

49. The structure claimed in claim 45 including means responsive to a signal from a source external of said means and connected to said pulse source to interrupt the transmission of pulses from one stage of said master counter to the next stage of said master counter for the duration of said signal, thereby inhibiting any change in state of said next stage and any succeeding stages of said master counter for the duration of said signal.

50. The structure claimed in claim 45 including reset means coupled to said master counter by which a predetermined number of said stages of said master counter may be instantly selectively reset to logical zero.

51. The structure claimed in claim 45 wherein said control logic is implemented in the form of a MOS integrated circuit, interfacing means between said MOS integrated circuit and said machine functions, some at least of said interfacing means comprising bidirectional thyristors controlled directly by said MOS integrated circuit.

52. The structure claimed in claim 45 wherein said period control logic comprises means to immediately reset a predetermined number of stages of said frequency divider to logical zero, said reset means being connected to outputs of some at least of said stages of said frequency divider whereby said reset means generates a reset signal in response to signals from said last mentioned stages of said frequency divider to shorten the period of said frequency divider, delay means responsive to said reset signal for properly resetting said frequency divider stages before said actuating signal disappears.

53. The structure claimed in claim 45 wherein said period control logic comprises means for bypassing at least one of said stages of said frequency divider.

54. The structure claimed in claim 53 wherein said means for bypassing said at least one of said stages of said frequency divider is actuated in part at least by the state of at least one of the succeeding stages of said master counter.

55. The structure claimed in claim 45 including a source of power for said control logic comprising a non-inductive DC power supply providing a first voltage and a second voltage, and means for delaying the establishment of said second voltage with respect to the establishment of said first voltage.

56. The control system of claim 45 including a source of AC line current, said pulse source comprising a circuit means to attenuate and rectify said line current, a master switch, said pulse source being connected to said source of line current through said master switch, interfacing means in said connections between some at least of said machine functions and the outputs of said function-control logic, said source of line current comprising a source of power for said some at least of said machine functions via said master switch and said interfacing means, a DC power supply connected to said source of line current through said master switch, said DC power supply comprising a source of power for said control logic.

57. The structure claimed in claim 56 including a safety switch in said connections between said master switch and said pulse source and between said master switch and said machine functions.

58. The structure claimed in claim 45 including a source of power for said control logic comprising a DC power source, at least one of said machine functions comprising a high current machine function, a source of AC voltage comprising a power source for said high current machine function, interfacing means connected between said high current machine function and its respective function-control logic output, said interfacing means comprising a high current bidirectional thyristor and a low current sensitive-gate bi-directional thyristor, said high current machine function being connected to said AC source via said high current bidirectional thyristor, the gate of said high current thyristor being connected to the load terminal of said low current thyristor, the gate of said low current thyristor being connected to said last mentioned function-control logic output.

59. The structure claimed in claim 58 wherein said control logic is implemented in the form of an MOS integrated circuit, said triac being controlled directly by said MOS integrated circuit.

60. The structure claimed in claim 43 including preset means coupled to said master counter by which a predetermined number of said stages of said master counter may be made to instantly selectively assume logical one or logical zero.

61. The structure claimed in claim 60 wherein said preset means is connected to outputs of some at least of said master counter stages to be preset whereby said preset means is activated by signals derived from said last mentiond master counter stages, delaying means between said stage outputs and said preset means whereby said master counter stages to be preset are properly preset before said actuating signal disappears.

62. The structure claimed in claim 43 wherein said appliance comprises a dishwashing machine.

63. The structure claimed in claim 43 including means responsive to a signal from a source external of said means and interposed between said pulse source and said master counter to interrupt the transmission of pulses from said master counter to interrupt the transmission of pulses from said pulse source to said master counter for the duration of said signal, thereby inhibiting any change in state of said master counter for the duration of said signal.

64. The structure claimed in claim 43 including means responsive to a signal from a source external of said means and interposed between said pulse source and said master counter to interrupt the transmission of pulses from one stage of said master counter to the next stage of said master counter for the duration of said signal, thereby inhibiting any change in stage of said next stage and any succeeding stages of said master counter for the duration of said signal.

65. The structure claimed in claim 43 including reset means coupled to said master counter by which a predetermined number of said stages of said master counter may be instantly reset to logical zero.

66. The structure claimed in claim 65 wherein said reset means is connected to outputs of some at least of said master counter stages to be reset whereby said reset means is actuated by signals derived from said last mentioned master counter stages, delaying means between said stage outputs and said reset means whereby said master counter stages to be reset are properly reset before said actuating signal disappears.

67. The structure claimed in claim 43 including interfacing means between said strategy logic and said machine functions.

68. The structure claimed in claim 43 wherein said control logic is implemented in the form of an MOS integrated circuit.

69. The structure claimed in claim 68 including interfacing means between said MOS integrated circuit and said machine functions.

70. The structure claimed in claim 69 wherein some at least of said interfacing means comprises bidirectional thyristors which are triggered into conduction directly from said MOS integrated circuit.

71. The structure claimed in claim 43 including means for bypassing at least one of said stages of said master counter.

72. The structure claimed in claim 71 wherein said means for bypassing at least one of said stages of said master counter depends in part at least for its activation on the state of at least one of the succeeding stages in said master counter.

* * * * *